US012591900B2

(12) United States Patent
Krishna et al.

(10) Patent No.: US 12,591,900 B2
(45) Date of Patent: Mar. 31, 2026

(54) SYSTEM AND METHOD FOR COLLECTING, ORGANIZING, AND CURATING CUSTOMER ENGAGEMENTS ACROSS MULTIPLE DOMAINS TO PROVIDE CONTEXTUAL NURTURING AND ALIGNMENT OF CUSTOMER JOURNEYS TO BUSINESS OBJECTIVES

(71) Applicant: Pelatro PTE. LTD, Singapore (SG)

(72) Inventors: Arun Kumar Krishna, Banaswadi (IN); Pramod Konandur Prabhakar, Banaswadi (IN)

(73) Assignee: Pelatro PTE. LTD, Singapore (SG)

( * ) Notice: Subject to any disclaimer, the term of this patent is extended or adjusted under 35 U.S.C. 154(b) by 104 days.

(21) Appl. No.: 18/396,240

(22) Filed: Dec. 26, 2023

(65) Prior Publication Data

US 2024/0211974 A1 Jun. 27, 2024

Related U.S. Application Data

(60) Provisional application No. 63/477,204, filed on Dec. 26, 2022.

(51) Int. Cl.
G06Q 30/0201 (2023.01)
G06Q 10/0637 (2023.01)

(52) U.S. Cl.
CPC ..... G06Q 30/0201 (2013.01); G06Q 10/0637 (2013.01)

(58) Field of Classification Search
CPC ...................... G06Q 30/0201; G06Q 10/0637
See application file for complete search history.

(56) References Cited

U.S. PATENT DOCUMENTS

| | | | | |
|---|---|---|---|---|
| 2012/0229657 A1* | 9/2012 | Calman | .................. | G06Q 30/00 |
| | | | | 348/222.1 |
| 2014/0025601 A1* | 1/2014 | Wouhaybi | .......... | G06Q 30/0282 |
| | | | | 705/347 |
| 2015/0287055 A1* | 10/2015 | Deshpande | ........ | G06Q 30/0201 |
| | | | | 705/7.29 |
| 2018/0343481 A1* | 11/2018 | Loheide | ............. | H04N 21/2543 |

OTHER PUBLICATIONS

Kyrychenko, et al., "The Role of Infocommunication Technologies in International Tourism Industry Development", 2022 IEEE 9th International Conference on Problems of Infocommunications, Science and Technology (PIC S&T) (2022, pp. 236-240) (Year: 2022).*

* cited by examiner

*Primary Examiner* — Amber A Misiaszek
(74) *Attorney, Agent, or Firm* — Richard C. Piercy, Esq.; Mathew L. Grell, Esq.; Grell & Watson Patent Attorneys LLC

(57) ABSTRACT

A system and method for collecting, organizing, and curating customer engagements across multiple interactions and touch points. The disclosed method allows for a discovery of purposes, an accretion of micro-journeys for a plurality of customers and a contextual nurturing of those customers on respective journeys towards their next milestones using numerical, graphical, statistical, and heuristics-based methods and proposed memory layouts of the same. Real-time staging and processing of inbound factual data and inferential dimensions into a multipartite multidimensional space of the factual and inferential dimensions to enable the mapping of customer interactions with a brand and the digital encoding thereof.

20 Claims, 16 Drawing Sheets

591
Type A
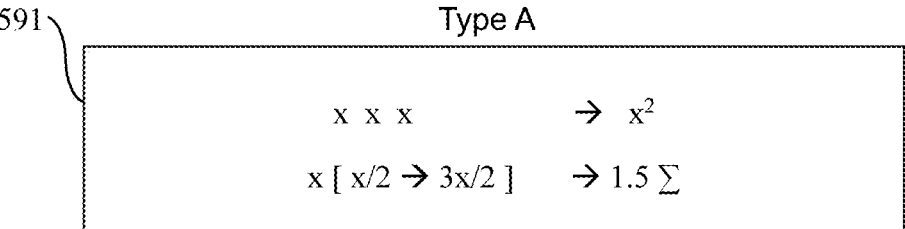
$$x \; x \; x \qquad \rightarrow \; x^2$$
$$x \, [ \, x/2 \rightarrow 3x/2 \, ] \qquad \rightarrow 1.5 \, \textstyle\sum$$
592
Type B
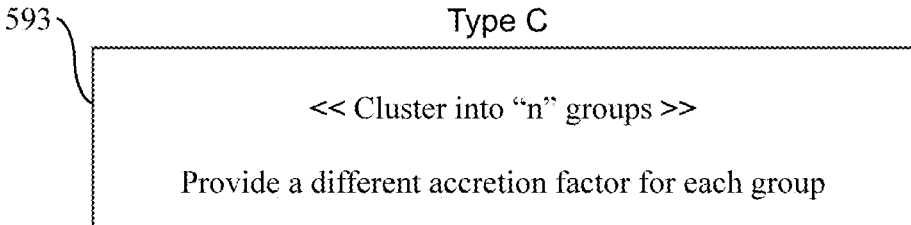
$$d = \frac{\text{sum} \, (\sum_{H/S/T/D})}{\text{sum} \, (\mu_{H/S/T/D})}$$
Drop if: $\qquad \sum_{H/S/T/D} / \mu_{H/S/T/D} < x * d$
593
Type C
<< Cluster into "n" groups >>
Provide a different accretion factor for each group
Fig. 5B

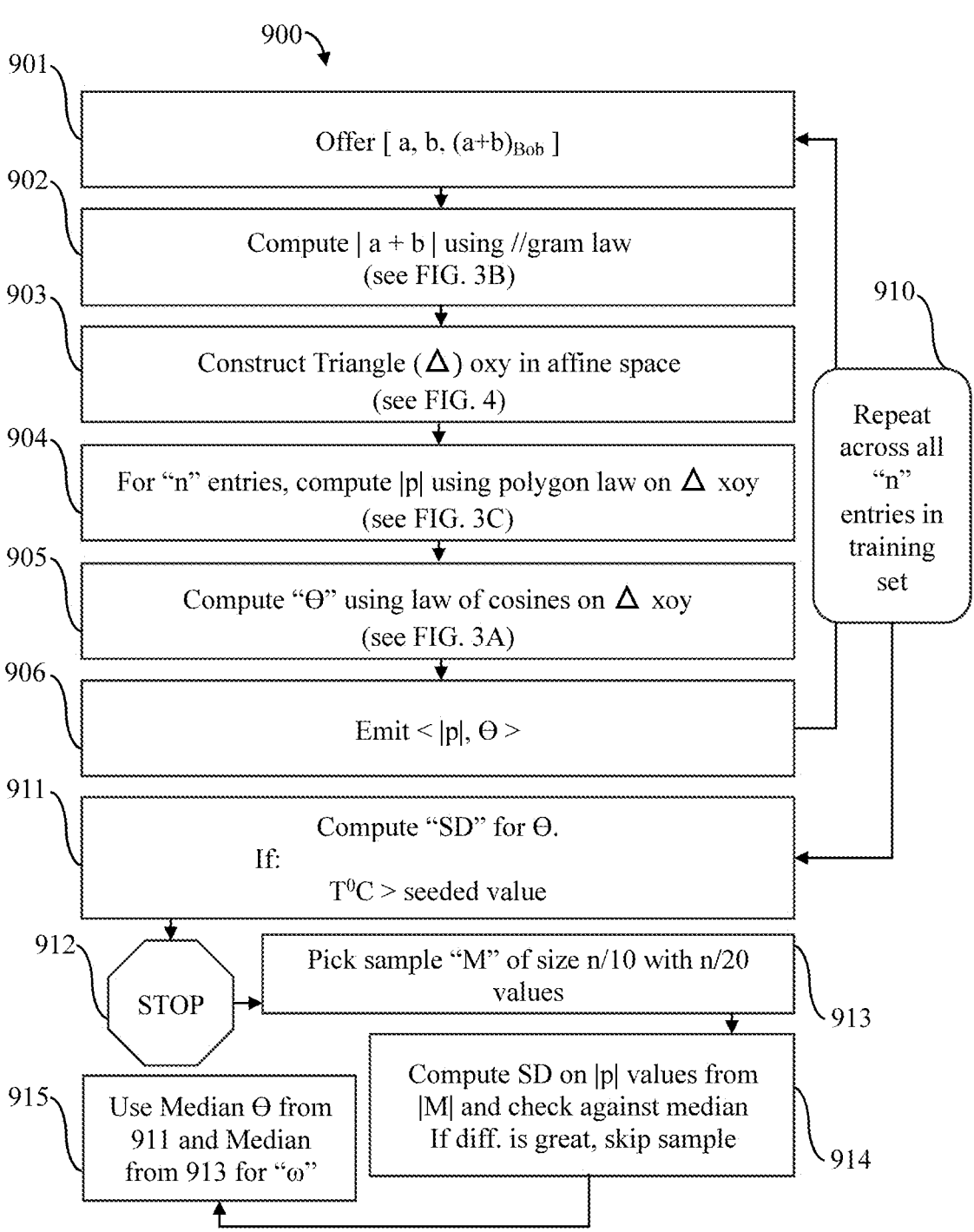

900

901 — Offer [ a, b, (a+b)$_{Bob}$ ]

902 — Compute | a + b | using //gram law
(see FIG. 3B)

903 — Construct Triangle ($\triangle$) oxy in affine space
(see FIG. 4)

904 — For "n" entries, compute |p| using polygon law on $\triangle$ xoy
(see FIG. 3C)

905 — Compute "$\Theta$" using law of cosines on $\triangle$ xoy
(see FIG. 3A)

906 — Emit < |p|, $\Theta$ >

910 — Repeat across all "n" entries in training set

911 — Compute "SD" for $\Theta$.
If:
$T^0C$ > seeded value

912 — STOP

913 — Pick sample "M" of size n/10 with n/20 values

914 — Compute SD on |p| values from |M| and check against median
If diff. is great, skip sample 915 — Use Median $\Theta$ from 911 and Median from 913 for "ω"

Fig. 9A

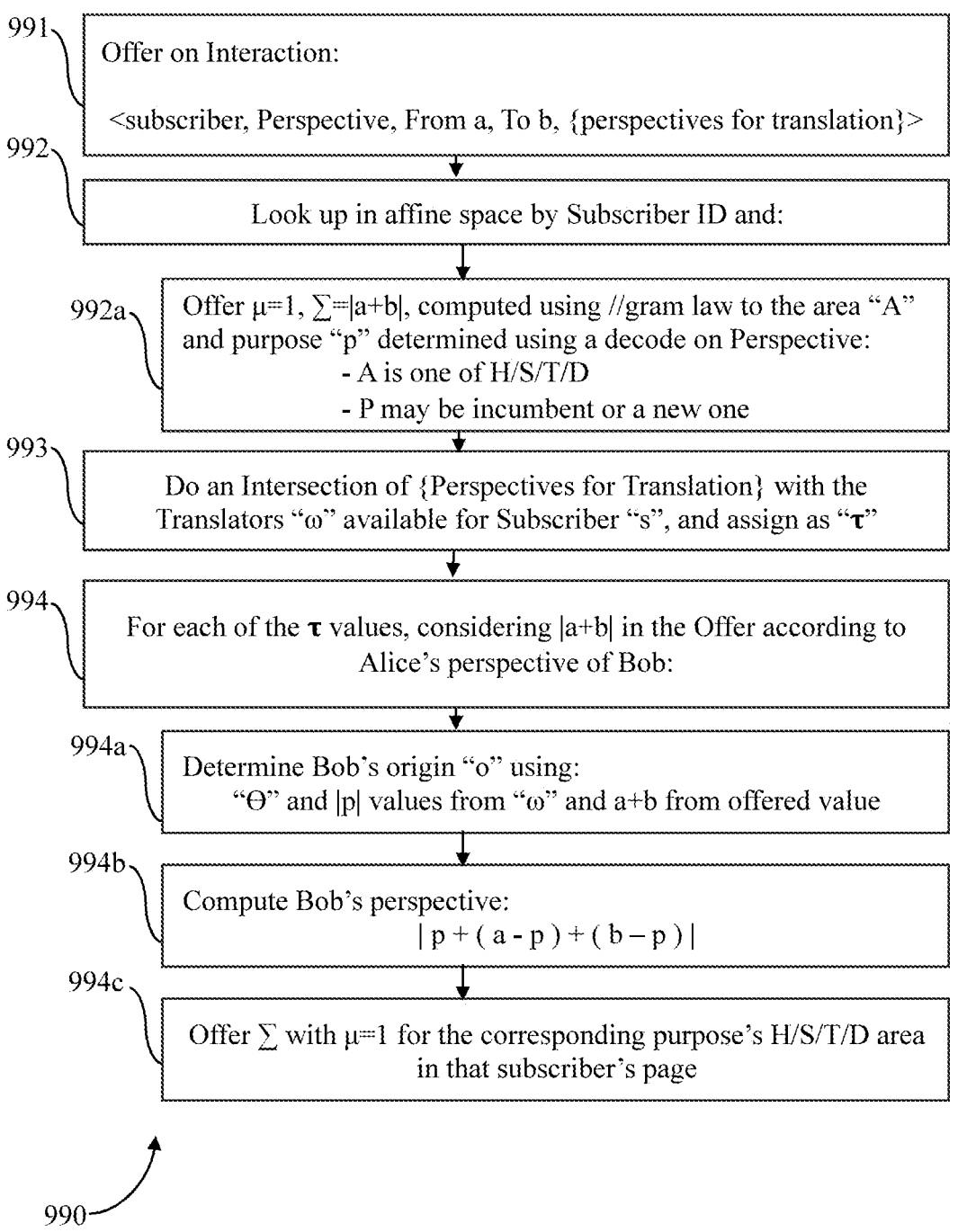

991

Offer on Interaction:

<subscriber, Perspective, From a, To b, {perspectives for translation}>

992

Look up in affine space by Subscriber ID and:

992a

Offer $\mu$=1, $\Sigma$=|a+b|, computed using //gram law to the area "A" and purpose "p" determined using a decode on Perspective:
- A is one of H/S/T/D
- P may be incumbent or a new one

993

Do an Intersection of {Perspectives for Translation} with the Translators "$\omega$" available for Subscriber "s", and assign as "$\tau$"

994

For each of the $\tau$ values, considering |a+b| in the Offer according to Alice's perspective of Bob:

994a

Determine Bob's origin "o" using:
"$\Theta$" and |p| values from "$\omega$" and a+b from offered value 994b Compute Bob's perspective:
$| p + ( a - p ) + ( b - p ) |$ 994c Offer $\Sigma$ with $\mu$=1 for the corresponding purpose's H/S/T/D area in that subscriber's page

SYSTEM AND METHOD FOR COLLECTING, ORGANIZING, AND CURATING CUSTOMER ENGAGEMENTS ACROSS MULTIPLE DOMAINS TO PROVIDE CONTEXTUAL NURTURING AND ALIGNMENT OF CUSTOMER JOURNEYS TO BUSINESS OBJECTIVES

CROSS REFERENCE TO RELATED APPLICATIONS

To the full extent permitted by law, the present United States Non-Provisional Patent Application hereby claims priority to and the full benefit of, U.S. Provisional Application No. 63/477,204, filed Dec. 26, 2022, entitled "Techniques for collecting, organizing, and curating customer engagements across multiple interactions and touch points, discovery of purposes, accretion of micro journeys and contextual nurturing on respective journeys towards their next milestones using numerical, graphical, statistical, and heuristics-based methods", which is incorporated herein by reference in its entirety.

FIELD OF THE DISCLOSURE

The present disclosure is directed to organization of user-relevant data in connection with product and services offerings and utilization. More specifically, the disclosure is directed to the collection and organization of real time user data to determine appropriate means and mechanisms for user interaction to facilitate increased user engagement, influence purchasing and subscription decisions, and otherwise influence user behavior.

The present disclosure is not limited to any specific file management system, user or customer type, database structure, physical computing infrastructure, enterprise resource planning (ERP) system/software/service, computer code language, or services offering.

BACKGROUND OF THE DISCLOSURE

Software service providers, financial institutions, telecommunications companies, social media services, and other user-service based businesses may generally have a large volume of customers, users, clients, and/or subscribers. Those businesses having such large customer volumes may generally further experience voluminous interactions with those customers, which may be enormous in scale and on a continuous basis. Data related to these volumes of interactions are generally highly valuable intellectual property to the businesses, which may be highly relevant to the core products and services of the business, but technical challenges exist as it may relate to meaningful use of the data, either with regard to real-time user behavior or to historical behaviors, patterns, and activities. This may be especially true with regard to providing a real-time guidance system to marketing efforts in order to effectively time certain user/business interactions to optimize business opportunities within its customer base, especially at the individual user-level. Given that marketing efforts often fall into two categories—inside sales and outside sales—businesses often develop strategies, using this data, in order to successfully market new revenue streams and/or purchases from new and/or existing customers. Since businesses likely know more about existing customers than they do prospective customers, marketing to existing customers may more heavily rely on such knowledge to increase marketing successes across existing clientele. However, given the nature of large subscriber and/or client bases, a single individual salesperson or account manager likely does not know and/or understand motivations of all existing clients. In fact, depending on the nature of the business in relation to the clientele and the volume of clientele of the business, few, if any of the business's agents may personally know the business's user base without performing market research, user surveys, or other similar research and investigation into the clientele relationship with the business and corresponding service. Even upon doing so, a comprehensive view or perspective may develop, which may only operate across a portion of its users based on a fit to one or more user-types, rather than across all users. For instance, a business may have a solid understanding of the desires and willingness to obtain certain services for certain demographics of its customer base, such as young professionals and those in early retirement, but variations among these groups may exist, the leveraging of which may assist the business to influence purchasing behaviors.

Additionally relevant to these concerns may be mid- to long-term planning and encouragement of certain behaviors of customers. In marketing parlance, such concerns may be addressed using the concept of customer journeys. A customer journey may be understood as a tool that helps marketers understand the series of connected experiences that customers desire and to take which steps to address certain needs. These may include examples ranging from completing a discrete desired task to traversing the end-to-end journey from prospective customer, then to a paying customer, then to loyal advocate of the business who may encourage other prospective customers, whether actively or passively, to join them on their journey. A customer journey in the context of banking, financial, telecom, social media, and other exemplary companies may refer to the various touchpoints and interactions a customer has with these industries throughout their entire relationship. Understanding and optimizing these journeys may be crucial for enhancing customer satisfaction and loyalty, and in turn for generating and encouraging overall business success.

Voluminous examples exist for each industry when it comes to understanding these journeys, many of which may be positively iteratively impacted through the tracking of customer behavior, processing of the resulting data, and active and passive means of nudging customers to perform certain tasks, obtain certain services, or otherwise influence their behavior to positively impact user/business interaction. For example, in the banking industry, account onboarding may include studying initial interaction(s) through online or in-branch account opening, submission of required documents for verification, account approval and activation, which may in turn result in day-to-day banking activities such as routine transactions (e.g., deposits, withdrawals, and transfers, ATM usage, online banking, and mobile app interactions, customer support for account-related queries. Certain customers of the financial institution may also participate in, for instance, a loan application process, which could yield certain data points or user data like user exploration of loan options and eligibility check, the submission of loan application and required documentation, an underwriting process and approval/denial. Customers of the institution may further engage the bank to provide certain highly interactive and ongoing services like financial planning and advisory wealth management that might include customer touchpoints like consultation with financial advisors for investment advice, wealth management and portfolio reviews, retirement planning discussions, investment decision-making, research and analysis of investment opportunities using portfolio management tools, trading and investment decisions on various financial instruments, and monitoring and adjusting investment portfolios. Banks offering consumer credit products, such as credit cards, to their customers may obtain certain data such as credit card usage, application and approval for credit cards, transaction history and credit limit management, customer support for credit card-related issues. Examples of customer journey information for telecommunication companies may include steps prior to agreeing to service activation, subscription to telecom services like mobile plans or internet packages, activation of SIM cards and other initial device setup information, billing and payments behaviors and history, monthly billing statements and usage tracking, utilization of certain payment options and bill settlement processes, customer support for billing inquiries, device upgrades and plans, evaluation and upgrade of mobile devices, exploration of new plans and features, contract renewals and plan changes, top-up history and behavior for pre-paid services, customer support and issue resolution, interaction(s) with customer support for technical issues, resolution of service interruptions and network problems, and handling of device-related problems.

In other regards, as it may relate to the active mapping and guided direction of customer journeys, and with regard to the contemporary landscape of customer interactions with brands, the abundance of structured and semi-structured data generated across diverse touchpoints poses a significant challenge for efficient onboarding of customer data as well as meaningful analysis thereof. As businesses strive to extract actionable insights from what may be described as a data inundation, existing methodologies often fall short in providing a cohesive and comprehensive approach, especially with regard to doing so meaningfully, effectively, and with immediacy and/or in real-time. Central challenges related to this problem may lie in seamlessly integrating large data volumes from data streams and varied customer engagements occurring across different channels and time-frames. Conventional methods struggle to organize and derive valuable insights from this diverse dataset, hindering the ability to understand customer behavior, preferences, and intents holistically.

Recently, various attempts have been made to address many technical challenges related to meaningful use of user data with respect to the holistic marketing via leveraging customer journeys, each attempt with its strengths and limitations. One approach involves utilizing customer relationship management (CRM) systems to track and analyze customer interactions. While CRM systems may offer valuable insights and may even produce highly meaningful reports and other analyses, even enabling the drilling down to the individual users and further enable the groupings thereof, they may fall short in providing a holistic view of customer engagement across different channels as well as may lack capabilities to provide long-term user engagement encouragement, implement multiple touchpoint strategies thereof, and monitor performance in order to continuously improve tracking toward business-development and business-improvement customer journeys. Furthermore, many of these existing systems may be limited to business-designed strategies to monitor and improve engagement over customer journeys, which may miss obvious patterns in customer data, which may be self-organizing, to recognize and even achieve potentially non-intuitive causes and effects in customer touchpoints on customer journeys. While many of these systems may have integrated state-of-the-art Artificial Intelligence (AI) and/or machine learning into such customer data domains in order to both glean insights and even take action to influence customer behavior, both underlying database organization as well as business-informed data structuring may be often lacking, thereby causing either significant resource deployment to achieve real-world benefits in this regard or diminished ability to trigger certain customer "nudges" in real time. As those having ordinary skill in the art may understand, when it comes to increasing user engagement, the timing of interaction may be as important as the type of customer interaction used. Therefore, much attention should be devoted to how user and customer interactions are monitored, how they are stored, how patterns and other trends are detected, and how certain "nudges" are triggered in order to effectually time such "nudges". While various database structures may have already been developed in order to properly align timing and customer encouragement strategies, mathematical, geometric, and logical frameworks in such processes can be beneficial to both the performance of such systems (with respect to types of encouragement and timing) and the ability of machines to interpret and develop strategies based on past and predicted performance.

Other previous attempts to address these challenges, as well as other techniques deployed in CRM product offerings, may even primarily focus on specific aspects of data organization or clustering techniques. However, these solutions may also lack a holistic approach to mapping customer interactions to business outcomes. The absence of an orientation-aware, self-organizing functional map data structure has often resulted in fragmented analyses, limiting the ability to discern overarching patterns and purposes from the customer's perspective. Recognizing the shortcomings in the existing art, those having ordinary skill in the art may admit the existence of a clear need for a system that not only efficiently onboards and organizes structured and semi-structured data but also aligns these interactions with business objectives. Many may even recognize that such a solution should be iterative, adaptive, and capable of evolving alongside dynamic customer behaviors and evolving business strategies. The present disclosure may address these challenges by introducing a novel approach by offering techniques for collecting, organizing, and curating customer engagements across multiple interactions and touch points. Such a strategy may further yield discovery of customer and customer cluster purposes, leading to an accumulation of customer "micro-journeys", which may in turn enable better and more valuable contextual nurturing of customer/business alignment along various respective journeys. One benefit may be the leading of such customers on such "micro-journeys" onto broader and longer journeys towards their next milestones, which may further be aligned with such customer/business interests, which may be achieved using numerical, graphical, statistical, and heuristics-based methods. By deploying a system of the disclosure according to the methods disclosed herein, semi-supervised learning techniques may also be leveraged in order to iteratively cluster certain identified events along purposes mapped within the business domain. Then, by deploying certain known algorithms and other mathematical frameworks in unconventional ways, the formation of purpose-bounded "trails" within the journey and/or map may then facilitate, nurture and otherwise encourage not only the formation of purpose-bound trails, but customer adherence to these purpose-bound trails, by essentially organizing them into a plurality of better understood, studied, and verified business-critical micro journeys that can provide a nuanced understanding of customer engagements to both machine learning environments as well as the business units being informed and guided by such new understanding(s)—even resulting in strategic guidance to customers and businesses in order to achieve certain desired outcomes to businesses and actionable business recommendation derived from better understanding of identified gaps in these journeys.

Therefore, a need persists for a comprehensive system and method that efficiently collects, organizes, and curates customer engagements across multiple interactions and inter-action-types, including user/business touch points, in order to discover purposes related to these interactions to establish micro-journeys and enable contextual nurturing along larger customer journeys toward business-oriented milestones through use of various numerical, graphical, statistical, and heuristics based methods. This disclosure addresses these challenges by providing a unified approach that encompasses all these aspects, offering a superior solution compared to prior attempts. The disclosed system and method may accomplish this feat by offering a unique combination of features, including an orientation aware datastructure with accretion support for efficient data organization and access, techniques to transform forest-of-purposes in business domains into a collection-of-shapes in geometric domains, and other transformation techniques to begin from a current shape (or form) into desired shape (or form), and using methods to reverse these transformations in order to offer them as actionable steps, instructions, or other guidance in business space to more efficaciously time who to market to and when.

SUMMARY OF THE DISCLOSURE

The present disclosure may solve the aforementioned limitations of the currently available systems and methods of marketing by providing techniques for collecting, organizing, and curating customer engagements across multiple interactions and touch points, facilitating discovery of customer purposes with respect to business offerings and purchasing decisions, accretion of micro-journeys and contextual nurturing of customers on respective larger journeys towards their a series of milestones on such journeys using numerical, graphical, statistical, and heuristics-based methods. These systems and methods may accomplish such missions by first efficiently onboarding user/business interactions as structured and semi-structured data generated out of diverse customer engagements with a brand at multiple touchpoints spread over time and then channelizing them into a self-organizing, orientation-aware functional map data structure. Then, such datastructures may be iteratively clustered using events along purposes mapped in business domain using semi-supervised learning techniques to facilitate accretion of purpose-bound trails with similar orientation into micro-journeys using certain accretion algorithm(s), transforming the discovered partial journeys into a simple geometric shape comprised of line segments and polygons. Having further structured these incoming events as geometrically structured data, missing shapes may be determined to transform the discovered partial journeys into certain desired business outcomes, which can also be mapped as geometric shapes using proven mathematical techniques. Then, reversing such transformations on identified gaps in such geometric shapes, specific actions may be prescribed as recommendations to nudge specific customers along the desired outcomes path, according to certain business desirables.

In one aspect, the disclosure may embrace the real time staging of ongoing engagements into a multipartite, multidimensional space, which may consist of at least two parts: (1) factual dimensions and (2) inferred dimensions. Orientation awareness within such multipartite, multidimensional space may be realized using extensions to classical affine space, where domains for certain dimensions may be discrete or continuous values, complete or incomplete, and even diverse variations in composition such as strict, weak, loose, non-ordered, rigid, or flexible, to establish co-ordinates for an event assigned probabilistic functions with conditionals that may even include future events based on predictive algorithms. These formulations may continuously update within the multipartite, multidimensional space where live co-ordinates for factual dimensions are deduced (i.e., predicted) based on contributions from newer events as they occur in real time, and by including passage of time which can be then factored into deducing values for the inferred dimensions in a two-step iterative process.

In other aspects, the disclosure may provide purpose(s) modelled to both inferred dimension(s) and a as one or more functional maps composed of four functional elements, which may be modeled and/or understood as hear ("H"), see ("S"), think ("T"), do ("D") in order to provide cognitive mapping from business space to mathematical models for customer purposes, which may be conceptualized as follows. By way of example and not limitation, H (hear) may correspond to what customers might experience in the form of personalized communications from the business or offers from the business (without necessarily registering the same in their minds), S (see) may correspond to those events or offerings that are in fact registered in the minds of end customers but without necessarily connecting to the business objective and/or purchase, T (think) may correspond to those events or actions that seem to be getting deeper on an offering and/or toward a purchase which may be observed through a transcendence of the face value of the offer/commodity/product/service, and D (do) may correspond to concrete actions including soliciting messages, purchase leads, purchases, and verbal endorsement(s) by end users who seem to be convinced towards getting what they are determined to pursue. Each of these elements may be accreted out of its constituents and at any point in time each of these elements may hold a net completeness value 'Σ' and number of constituents value 'μ'. Then, via quantitative formulation for "c" at the level of an individual customer as a function of time bound variations in 'Σ' and 'μ' over each of these elements (H, S, T, D), relative changes in alignment levels for different purposes over near past and in backdrop of macro changes in purpose may form alignments across different customer segments. Using techniques to provide contextual nurturing of customers, nudges which may be needed to optimize customer/business purpose alignment may be accomplished by recommending appropriate actions required to catch up any lagging elements which may be present in the H/S/T/D formulation set, which may be generated using reverse transformation for cognitive mapping function(s).

In yet another aspect, graphical user interface (GUI) based widget(s) may be provided for configuring customer journey maps with clear objectives, milestones, and guidance paths for customers "walking" along those journeys alongside tentative estimates for count of how many of such customers crossing any given milestone may be calibrated on the time axis. This interface may then provide transformation of these journeys into a 3-dimensional geometric shape in a 3-dimensional Affine space having milestones, time, and customer count as the axes in order to yield further observational tools and prescriptive marketing and sales support. Such methods, including those established to provide an interface tool to study, monitor, plan, and react to discoveries in user behavior and motivations may assist to determine alignment of customer experiences, interactions, and engagements with the larger business objectives, leading to journey maps having analysis of intersecting milestones, gradients between milestones and similar elementary efficient programmable techniques, and creation of cohorts that most likely represent people in similar phases of similar journeys. By continuously receiving performance related data to these objectives, journey re-calibration may be established in order to glean what consideration(s) of customers are relevant to their purpose(s), perhaps by finding the most relevant journey from the configured business journey maps that can best align with the customers and/or customer cohorts/clusters by computing the overlap between inferred purposes for each of the projected journeys leading to the stated business objective and the incumbent customer purpose alignment trail, offering them the recommended trail of milestones to obtain certain business objectives.

Having assembled the above into a comprehensive system and method, further facilitation of nurturing of leads derived from the engagements towards a conversion, sale, upsell, or increased utilization may be continually assessed using the systems and methods of the disclosure and/or machine learning to improve performance of subsequent contextual nurturing. The system's continuous assessment and refinement of nurturing strategies, micro-journeys, and customer journeys may represent yet another significant leap forward in business strategy aligned conversion optimization. By leveraging machine learning and the wealth of data collected through large volumes of incoming data and actions planned and based on the study thereof, the system can ensure that nudging efforts are always refined and optimized for maximum effectiveness. This iterative approach to nurturing has not only been shown to boost conversion rates for businesses deploying such systems, but can also lay the foundation for optimized and sustained business growth.

Many additional features and benefits of the disclosed system and methods thereof may be appreciated by those having ordinary skill in the art. One such benefit of the present disclosure may be the ease by which certain observations made through the geometric and heuristics-based arrangement of information can be presented to marketing users for study and revelation of certain common traits or steps in customer journeys as micro-journeys as they may relate or be otherwise applicable to certain business considerations, motivations, and opportunities. Such visualizations may further be implemented in ways discussed in relation to the drawings, including the assembly of customer journeys ad-hoc by technicians, which may then accrete within historic and/or incoming data, certain traits, engagements, timings, and other relevant information to better nudge customers into micro-journeys likely to establish customer conformity to customer journeys which may be opportune for business. Additional benefits may include specific data organization schema, which may limit the processing power and resource consumption required (especially with regard to the training of certain large language models LLMs and other machine learning techniques), but also enable the quick, immediate, and/or real-time responses of such a system, which may prove critical to making certain customer offers and/or nudges and the effectiveness and/or customer receptivity thereof. Yet other benefits include the data structure's inherent trait of accretion—traits/datapoints may be enabled to be fused within the physical organization of the data, further optimizing these aspects and yielding highly compacted dense data structures which may further prevent fragmentation. Finally, by organizing data according to certain heuristics, mapping, and geometric properties, both artificial intelligence/machine learning, as well as logical associations by humans studying the data and patterns can be augmented while maintaining the ability to drill down to studying individual customers, their revealed purposes, and behavior in response to certain actions by the business.

The systems and methods of the disclosure may accomplish the above through a plurality of numerical, statistical, graphical, geometric and heuristics-based techniques applied to incoming user interaction data in relation to historic and predictive data, each of which are covered in detail below in relation to the Drawings. In summary, such techniques may begin with and/or rely on streaming ingestion of digital interactions of customers across channels, the accumulation of such data, the monitoring of patterns/associations of such data to predictive models as well as to customer stimuli, and recommended actions and/or prescriptive strategies to increase user engagement toward business objectives and the monitoring of performance thereof.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

The present disclosure will be better understood by reading the Detailed Description with reference to the accompanying drawings, which are not necessarily drawn to scale, and in which like reference numerals denote similar structure and refer to like elements throughout, and in which:

FIG. 5B is a block diagram of exemplary accretion strategies of the disclosure among the H/S/T/D domains of FIG. 5A;

FIG. 9A is a method flowchart of an exemplary translator learning model for an artificial intelligence and/or machine learning system of the disclosure;

FIG. 9B is a method flowchart of an exemplary affine space vector addition technique using the translator learning model of FIG. 9A;

DETAILED DESCRIPTION

Referring now to FIGS. 1-11, in describing the exemplary embodiments of the present disclosure, specific terminology is employed for the sake of clarity. Certain terms, as they may be relevant to the quantitative assessment of user and subscriber behaviors as well as business actions to elicit certain behaviors may be defined as follows. An interaction may mean any distinct/discrete touchpoint between a user/subscriber and a business at a specific time, though potentially with a plurality of purposes to achieve a business objective. Such interaction could come in many varieties, including an informational message, a phone call, a coupon, an offer for a new service addition, the like and/or combinations thereof. Engagement may mean a group of interactions having some cohesivity toward a business objective. A micro-journey may mean any activity experienced and/or performed by a user/subscriber which has a purpose in the mind of the user/subscriber. A journey may mean the interactions, engagements, micro-journeys, and other events between the user and business as may be observed by the business toward one or more business objectives. The present disclosure may use the terms customer, user, subscriber, consumer, and advocate interchangeably, and the disclosure is not so limited to those which an individual pays or otherwise financially rewards a business for provision of products and/or services, which may also be used interchangeably herein. Additionally, as may be important to the mathematical and trigonometric features of the disclosure, certain conventions for the naming of triangles may be observed and/or not included for purposes such as emphasis upon a specific angle, side, or other feature of such triangles. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples and are merely examples among other possible examples.

The present disclosure solves the aforementioned limitations of the currently available devices, computerized systems, and methods thereof for collecting, organizing, and curating customer engagements across multiple domains to provide contextual nurturing and alignment of customer journeys to business objectives.

Figure 1A:
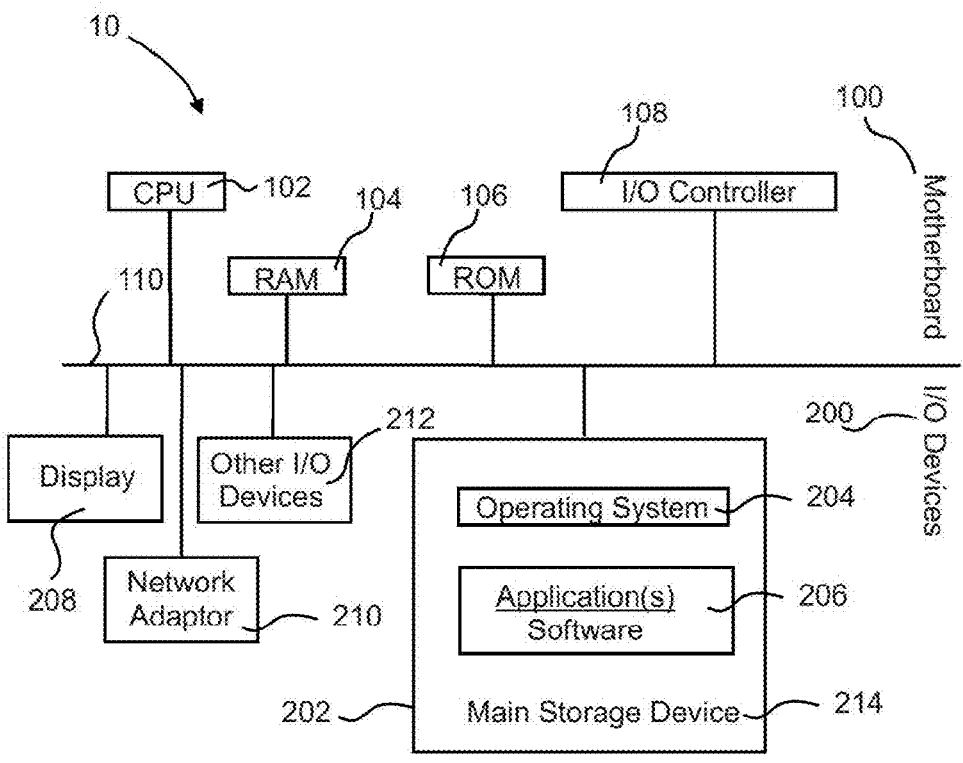
FIG. 1A is a block diagram of a computer system of the present disclosure.
Figure 1B:
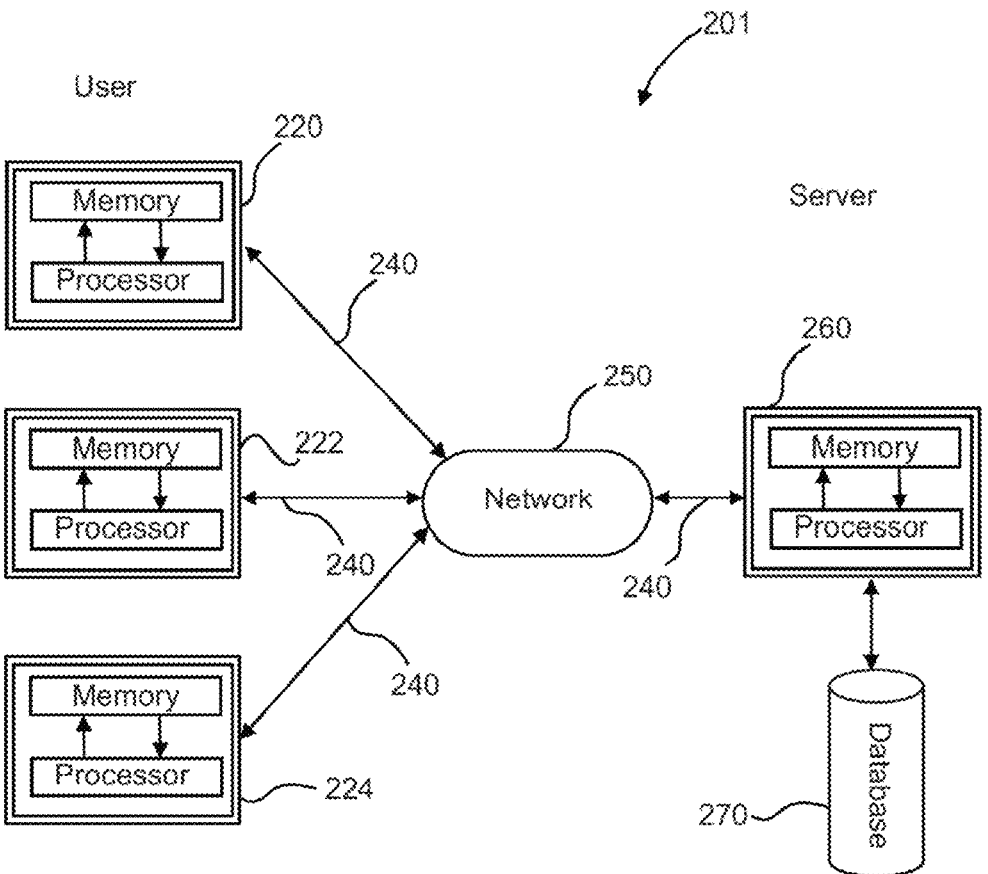
FIG. 1B is a block diagram of a communications system implemented by the computer system in FIG. 1.

In describing the exemplary embodiments of the present disclosure, as illustrated in FIGS. 1A-1B. specific terminology is employed for the sake of clarity. The present disclosure, however, is not intended to be limited to the specific terminology so selected, and it is to be understood that each specific element includes all technical equivalents that operate in a similar manner to accomplish similar functions. The claimed invention may, however, be embodied in many different forms and should not be construed to be limited to the embodiments set forth herein. The examples set forth herein are non-limiting examples, and are merely examples among other possible examples. It should further be noted that with respect to FIGS. 1A-1B, FIGS. 2A-2B, as well as other Drawings of the disclosure, vast simplification of these techniques may be described herein in order to succinctly demonstrate various features of the disclosure, but applicability to larger, vastly more complicated systems may be achieved by those having ordinary skill in the art using other steps, features, systems, methods, and techniques as may be disclosed herein.

As will be appreciated by one of skill in the art, the present disclosure may be embodied as a method, data processing system(s), software as a service (SaaS), computer program product(s), artificial intelligence system(s), large language model(s), the like and/or combinations thereof. Accordingly, the present disclosure may take the form of an entirely hardware embodiment, an entirely software embodiment or an embodiment combining software and hardware aspects in order to solve the various technical problems with the various technical solutions as may be disclosed herein. Furthermore, the present disclosure may take the form of a computer program product on a computer-readable storage medium having computer-readable program code means embodied in the medium. Any suitable computer readable medium may be utilized, including hard disks, ROM, RAM, CD-ROMs, electrical, optical, magnetic storage devices and the like.

The present disclosure is described below with reference to block and flowchart illustrations of methods, apparatus (systems) and computer program products according to embodiments of the present disclosure. It will be understood that each block or step of the flowchart illustrations, and combinations of blocks or steps in the flowchart illustrations, can be implemented by computer program instructions or operations. These exemplary computer program instructions, functions, equations, and/or operations may be loaded onto a general-purpose computer, special purpose computer, server, or other programmable data processing apparatus to produce a machine, such that the instructions or operations, which execute on the computer or other programmable data processing apparatus, create means for implementing the functions specified in the flowchart block or blocks/step or steps.

These computer program instructions or operations may also be stored in a computer-usable memory that can direct a computer or other programmable data processing apparatus to function in a particular manner, such that the instructions or operations stored in the computer-usable memory produce an article of manufacture including instruction means which implement the function specified in the flowchart block or blocks/step or steps. The computer program instructions or operations may also be loaded onto a computer or other programmable data processing apparatus (processor) to cause a series of operational steps to be performed on the computer or other programmable apparatus (processor) to produce a computer implemented process such that the instructions or operations which execute on the computer or other programmable apparatus (processor) provide steps for implementing the functions specified in the flowchart block or blocks/step or steps. Accordingly, blocks or steps of the flowchart illustrations support combinations of means for performing the specified functions, combinations of steps for performing the specified functions, and program instruction means for performing the specified functions. It should also be understood that each block or step of the flowchart illustrations, and combinations of blocks or steps in the flowchart illustrations, can be implemented by special purpose hardware-based computer systems, which perform the specified functions or steps, or combinations of special purpose hardware and computer instructions or operations.

Computer programming for implementing the present disclosure may be written in various programming languages, database languages, the like and/or combinations thereof. However, it is understood that other source or object-oriented programming languages, and other conventional programming language may be utilized without departing from the spirit and intent of the present disclosure.

Referring now to FIG. 1A specifically, there is illustrated a block diagram of a simplified computing system 10 that provides a suitable environment for implementing embodiments of the present disclosure. The computer architecture shown in FIG. 1A, as may be well understood by those having ordinary skill in the art, is divided into two parts—motherboard 100 and the input/output (I/O) devices 200. Motherboard 100 preferably includes subsystems and/or processor(s) to execute instructions such as central processing unit (CPU) 102, a memory device, such as random-access memory (RAM) 104, input/output (I/O) controller 108, and a memory device such as read-only memory (ROM) 106, also known as firmware, which are interconnected by bus 110. A basic input output system (BIOS) containing the basic routines that help to transfer information between elements within the subsystems of the computer is preferably stored in ROM 106, or operably disposed in RAM 104. Computing system 10 further preferably includes I/O devices 202, such as main storage device 214 for storing operating system 294 and instructions or application program(s) 206, and display 208 for visual output, and other I/O devices 212 as appropriate. Main storage device 214 preferably is connected to CPU 102 through a main storage controller (represented as 108) connected to bus 110. Network adapter 210 allows the computer system to send and receive data through communication devices or any other network adapter capable of transmitting and receiving data over a communications link that is either a wired, optical, or wireless data pathway. It is recognized herein that central processing unit (CPU) 102 performs instructions, operations or commands stored in ROM 106 or RAM 104.

Processor 102 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1A as a single processor, in some embodiments, processor 102 comprises a plurality of processors. The plurality of processors may be embodied on a single computing device or may be distributed across a plurality of computing devices collectively configured to function as the computing device 10. The plurality of processors may be in operative communication with each other and may be collectively configured to perform one or more functionalities of the computing device 10 as described herein. In an example embodiment, processor 102 is configured to execute instructions stored in memory 104, 106 or otherwise accessible to processor 102. These instructions, when executed by processor 102, may cause the computing device 10 to perform one or more of the functionalities of the computing device 10 as described herein.

Whether configured by hardware, firmware/software methods, or by a combination thereof, processor 102 may comprise an entity capable of performing operations according to embodiments of the present invention while configured accordingly. Thus, for example, when processor 102 is embodied as an ASIC, FPGA or the like, processor 102 may comprise specifically configured hardware for conducting one or more operations described herein. As another example, when processor 102 is embodied as an executor of instructions, such as may be stored in memory 104, 106, the instructions may specifically configure processor 102 to perform one or more algorithms and operations described herein.

The plurality of memory components 104, 106 may be embodied on a single computing device 10 or distributed across a plurality of computing devices. In various embodiments, memory may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. Memory 104, 106 may be configured to store information, data, applications, instructions, or the like for enabling the computing device 10 to carry out various functions in accordance with example embodiments discussed herein. For example, in at least some embodiments, memory 104, 106 is configured to buffer input data for processing by processor 102. Additionally or alternatively, in at least some embodiments, memory 104, 106 may be configured to store program instructions for execution by processor 102. Memory 104, 106 may store information in the form of static and/or dynamic information. This stored information may be stored and/or used by the computing device 10 during the course of performing its functionalities.

Many other devices or subsystems or other I/O devices 212 may be connected in a similar manner, including but not limited to, devices such as microphone, speakers, flash drive, CD-ROM player, DVD player, printer, main storage device 214, such as hard drive, and/or modem each connected via an I/O adapter. Also, although preferred, it is not necessary for all of the devices shown in FIG. 1A to be present to practice the present disclosure, as discussed below. Furthermore, the devices and subsystems may be interconnected in different configurations from that shown in FIG. 1A, or may be based on optical or gate arrays, or some combination of these elements that are capable of responding to and executing instructions or operations. The operation of a computer system such as that shown in FIG. 1A is readily known in the art and is not discussed in further detail in this application, so as not to overcomplicate the present disclosure with unnecessary recitations of well-known computing technologies.

In some embodiments, some or all of the functionality or steps may be performed by processor 102. In this regard, the example processes and algorithms discussed herein can be performed by at least one processor 102. For example, non-transitory computer readable storage media can be configured to store firmware, one or more application programs, and/or other software, which include instructions and other computer-readable program code portions that can be executed to control processors of the components of system 201 to implement various operations, including the examples shown above. As such, a series of computer-readable program code portions may be embodied in one or more computer program products and can be used, with a computing device, server, and/or other programmable apparatus, to produce the machine-implemented processes discussed herein.

Any such computer program instructions and/or other type of code may be loaded onto a computer, processor or other programmable apparatuses circuitry to produce a machine, such that the computer, processor or other programmable circuitry that executes the code may be the means for implementing various functions, including those described herein.

Referring now to FIG. 1B, there is illustrated a diagram depicting an exemplary system 201 in which concepts consistent with the present disclosure may be implemented or performed. Examples of each element within the communication system 201 of FIG. 1B are broadly described above with respect to FIG. 1A. In particular, the server system 260 and user system 220 have attributes similar to computer system 10 of FIG. 1A and illustrate one possible implementation of computer system 10. Communication system 201 preferably includes one or more user systems 220, 222, 224, one or more server system 260, and network 250, which could be, for example, the Internet, public network, private network or cloud. User systems 220-224 each preferably include a computer-readable medium, such as random-access memory, coupled to a processor. The processor, CPU 102, executes program instructions or operations stored in memory. Communication system 201 typically includes one or more user system 220. For example, user system 220 may include one or more general-purpose computers (e.g., personal computers), one or more special purpose computers (e.g., devices specifically programmed to communicate with each other and/or the server system 260), a workstation, a server, a device, a digital assistant or a "smart" cellular telephone or pager, a digital camera, a component, other equipment, or some combination of these elements that is capable of responding to and executing instructions or operations.

Similar to user system 220, server system 260 preferably includes a computer-readable medium, such as random-access memory, coupled to a processor. The processor executes program instructions stored in memory. Server system 260 may also include a number of additional external or internal devices, such as, without limitation, a mouse, a CD-ROM, a keyboard, a display, a storage device and other attributes similar to computer system 10 of FIG. 1A. Server system 260 may additionally include a secondary storage element, such as database 270 for storage of data and information. Server system 260, although depicted as a single computer system, may be implemented as a network of computer processors. Memory in server system 260 contains one or more executable steps, program(s), algorithm(s), or application(s) 206 (shown in FIG. 1A). For example, the server system 260 may include a web server, information server, application server, one or more general-purpose computers (e.g., personal computers), one or more special purpose computers (e.g., devices specifically programmed to communicate with each other), a workstation or other equipment, or some combination of these elements that is capable of responding to and executing instructions or operations.

System 201 is capable of delivering and exchanging data between user system 220 and a server system 260 through communications link 240 and/or network 250. Through user system 220, users can preferably communicate over network 250 with each other user system 220, 222, 224, and with other systems and devices, such as server system 260, to electronically transmit, store, manipulate, and/or otherwise use data exchanged between the user system and the server system. Communications link 240 typically includes network 250 making a direct or indirect communication between the user system 220 and the server system 260, irrespective of physical separation. Examples of a network 250 include the Internet, cloud, analog or digital wired and wireless networks, radio, television, cable, satellite, and/or any other delivery mechanism for carrying and/or transmitting data or other information, such as to electronically transmit, store, manipulate, and/or otherwise modify data exchanged between the user system and the server system. The communications link 240 may include, for example, a wired, wireless, cable, optical or satellite communication system or another pathway. It is contemplated herein that RAM 104, main storage device 214, and database 270 may be referred to herein as storage device(s) or memory device(s).

Figure 2A:
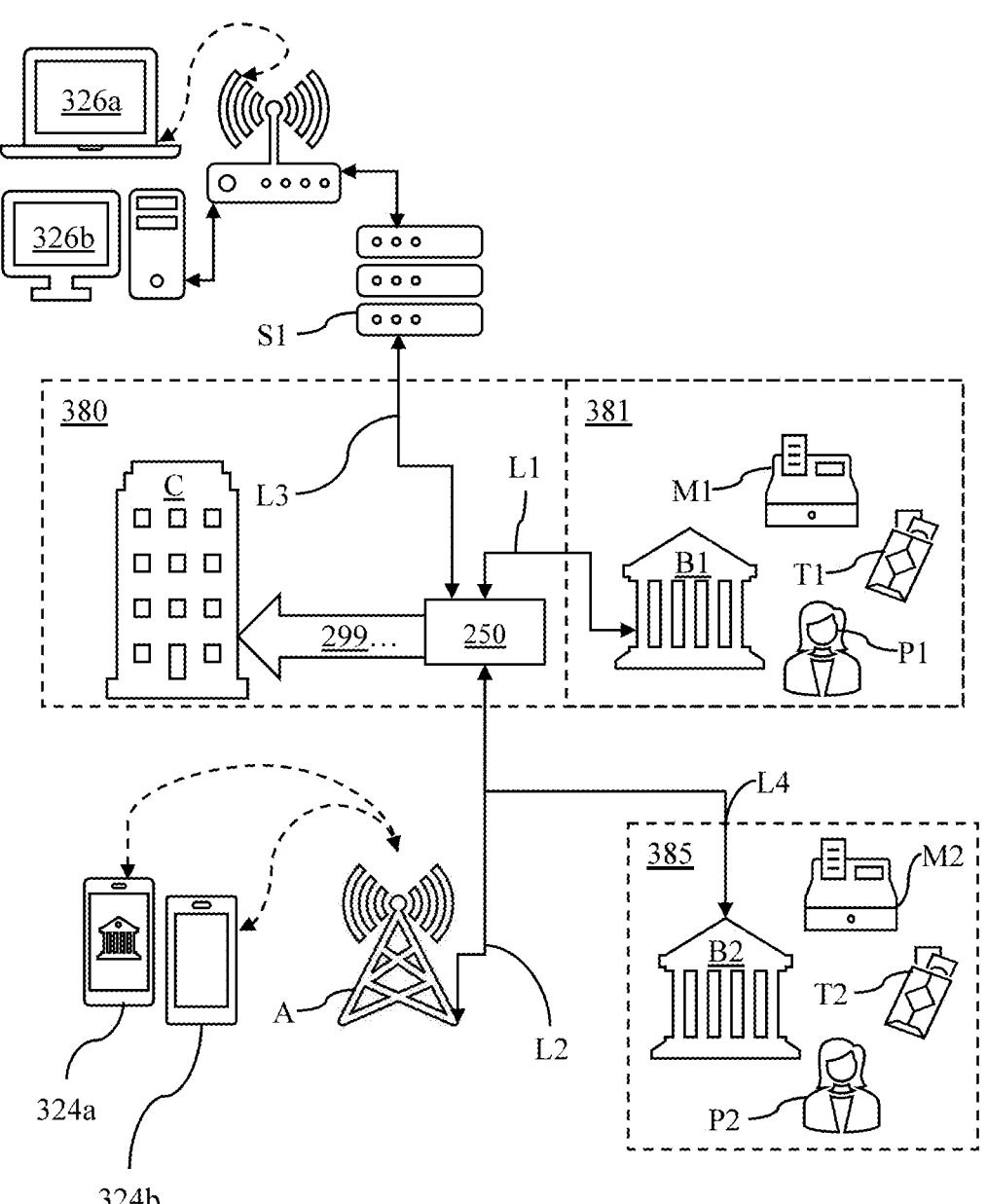
FIGS. 2a-b are block diagrams of exemplary B2C communication/interaction systems of the disclosure.

With respect to FIG. 2A, therein illustrated is a block chart of an exemplary intake ingestion scheme of the exemplary telecommunication network and computerized services infrastructure, which may access or be in receipt of certain financial, social media, entertainment, or other networks via datastream 299 as may be herein described and/or recognized by those having ordinary skill in the art, and may be described in a basic exemplary embodiment in FIG. 2A. Basic components, which may or may not be required depending on the users/systems/subscribers/customers/content being monitored, studied, or stored, are exemplary only. A system and method according to the disclosure may be and likely is more complicated than may be illustrated in FIGS. 1A, 1B, 2A, 2B and otherwise, and may involve multiple (or numerous) towers, user devices, networks, servers, users, the like, and/or combinations thereof as may be understood by those having ordinary skill in the art. Beginning with various subscriber/user interaction(s) with various telecommunications and other computerized services infrastructure, first subscriber device 324a and second subscriber device 324b may each interact with antenna A (via wired or wireless connections), which may in turn transmit data and/or communicate via telecommunication line L2 with, for example, corporate servers C via network 250, which may or may not form a part of, for instance, the Internet, and other devices on network 250, which may reside on corporate network infrastructure 380, which may include exemplary database 270b, user systems 220, 222, 224 and agent systems C1-C3 (see FIG. 2B) via e.g., network lines 240 (see FIG. 1B) or communication links L1-L4. As may be understood by those having ordinary skill in the art, certain subscriber devices, such as e.g., first subscriber device 324a, may feature a mobile application configured to perform certain functions within the services domain of the business and communicate therewith via a credentialling system, which may be secure. Additionally, other user devices, such as laptop 326a, desktop 326b, and external server S1 may communicate similarly to network 250 and so on. Importantly, various branches of a business may operate via public and/or private networks to network 250, such as branch office B1 and branch office B2, which may feature among connected branch devices 381 and connected branch devices 385, respectively, through use of POS systems M1-M2, automated customer machines T1-T2, and branch associate machines P1-P2. Obviously, a high volume system, such as those designed to benefit from the disclosed system and method for collecting, organizing, and curating customer engagements across multiple domains to provide contextual nurturing and alignment of customer journeys to business objectives may be much more complicated than the elementary network examples provided herein, and may feature many hundreds or even millions of such exemplary devices as illustrated herein, and be connected via means known by those having ordinary skill in the art. By way of example and not limitation, such networks may take the form of private networks, virtual private networks, secure connections on the Internet or the Web, the like, and/or combinations thereof. These systems and the various communications and/or transactions thereof in communication with corporate servers C may obtain vast quantities of data via one or more of datastream 299, such that customer/user interactions may be received, stored, catalogued, analyzed, reported, and otherwise acted upon as may be herein described. The above communications and computerized services environment, at least with respect to the disclosed system and method for collecting, organizing, and curating customer engagements across multiple domains to provide contextual nurturing and alignment of customer journeys to business objectives, its features and benefits, and potential implementations may be even better understood by those having skill in the art from a review of the remaining FIGS. 2B-11, in addition to the accompanying Detailed Description.

Figure 2B:
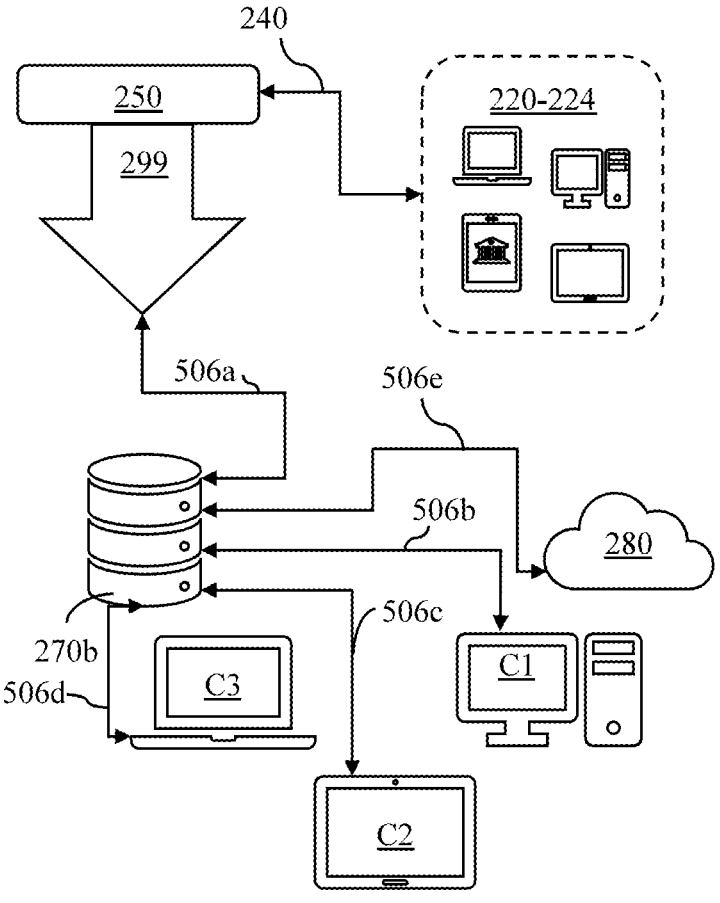

Referring now specifically to FIG. 2B, therein illustrated is a block diagram of exemplary business-to-consumer (B2C) communication/interaction system of the disclosure in receipt of datastream 299 via network 250 as described above. As may be understood by those having ordinary skill in the art, one or more exemplary database 270b may be the primary recipient of comprehensive data, from e.g., user systems or devices 220-240, much of which may be relevant to transactions, information thereof, and other services performed by the company, which may be relevant to the overall performance and interests of the company as may be herein described. Such datastream 299 may be received via communications link 506a by exemplary database 270b, where it may be again transmitted via appropriate channels to accomplish such transactions and/or services. Exemplary database 270b may further feature comprehensive and/or sophisticated hardware and software installed thereon to perform the various tasks, analyses, data transformations, and computations as may be herein described and may in turn communicate the results thereof or receive instructions to perform such tasks to and/or from corporate systems C1-C3, and such communications may be accomplished via links 506b, 506c, and 506d, respectively. Additionally, certain other devices owned and/or authorized by the company to access, process, or otherwise perform tasks upon such data within datastream 299 may do so through private cloud 280, which may further be connected to exemplary database 270b, or alternatively through private and/or secure connections thereof via network 250. The above communications and computerized services environment as illustrated herein FIG. 2B, as well as those described above in relation to FIG. 2A, at least with respect to the disclosed system and method for collecting, organizing, and curating customer engagements across multiple domains to provide contextual nurturing and alignment of customer journeys to business objectives, its features and benefits, and potential implementations may be further understood by those having skill in the art from a review of the remaining FIGS. 3-11, in addition to the accompanying Detailed Description.

Figure 3A:
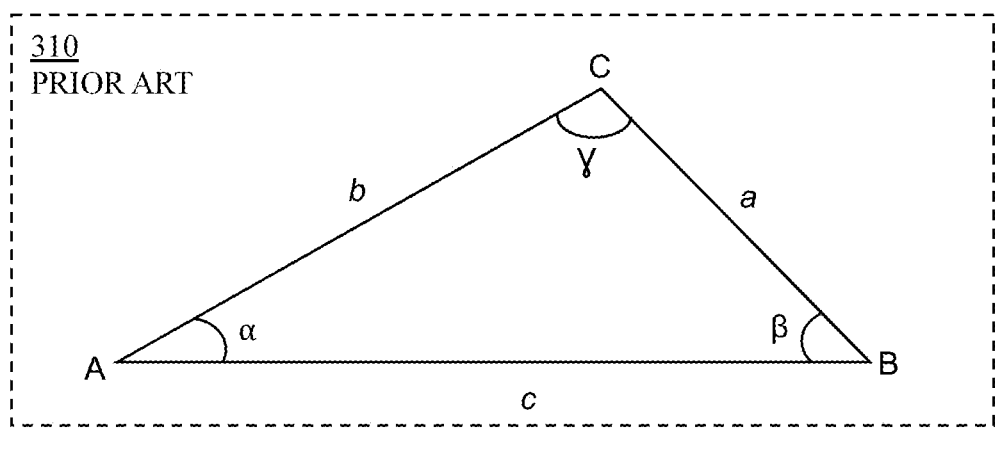
FIGS. 3A-C are illustrations of prior art geometric and trigonometric principles relevant to the disclosed data transformation systems and methods.
Figure 3B:
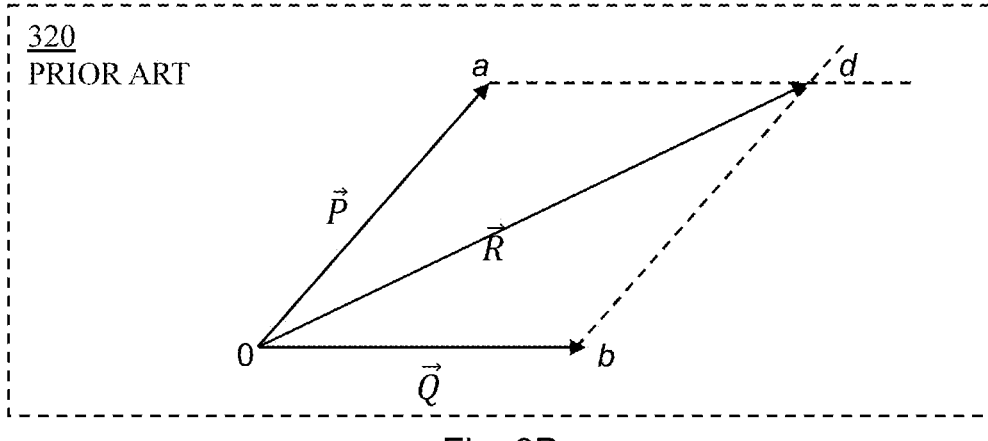
Figure 3C:
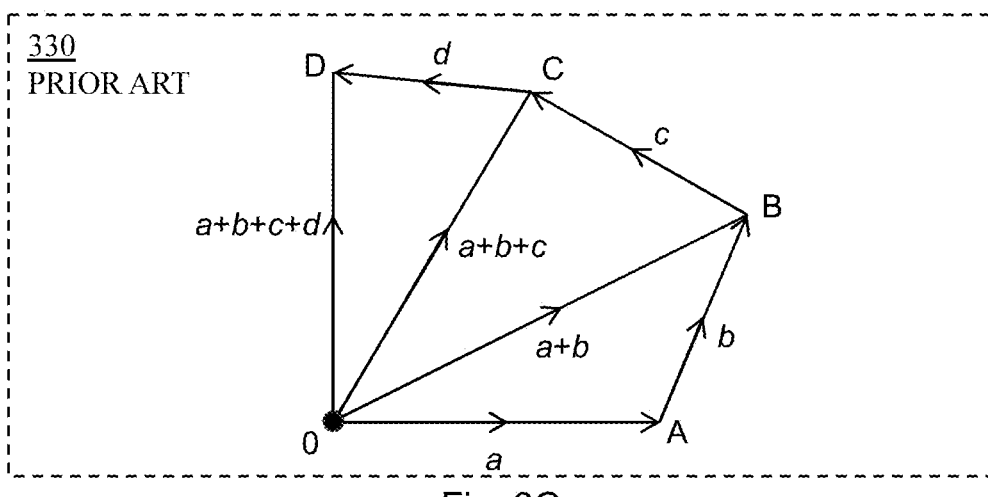

Turning to FIGS. 3A-C, generally they may provide background illustrations of prior art geometric principles relevant to the disclosed data transformation systems and methods as described herein. Beginning at FIG. 3A, therein illustrated is triangle 310 illustrating the law of cosines. Essentially, for a triangle with sides a, b, and c and opposite respective angles α, β, and γ, the law of cosines states that $c^2=b^2+a^2-2$ a b $cos(\gamma)$, as well as other well-known equivalents. The law of cosines is useful for solving a triangle when all three sides or two sides and their included angle are given, as may be further relevant to the data transformational techniques and affine space coordinate systems as are disclosed herein. Turning to FIG. 3B, therein illustrated is parallelogram 320 illustrating the parallelogram law of vector addition, which states that if one places two vectors so they have the same initial point, and then completes the vectors into a parallelogram, then the sum of the vectors is the directed diagonal that starts at the same point as the vectors. As it may be relevant to the example provided in parallelogram 320, if 2 vectors (e.g., $\vec{P}$, $\vec{Q}$) acting simultaneously at a point (e.g., 0) are represented both in magnitude and direction by the adjacent sides of a parallelogram drawn from that point (0), the resultant vector (e.g., $\vec{R}$) can be represented in both magnitude and direction of the parallelogram passing through that point-illustrated as d in the example provided. Then, as may be further relevant to the disclosure, $\vec{P}+\vec{Q}=\vec{R}$ with $0_a$ and $0_b$ denoting $\vec{P}$ and $\vec{Q}$, the two adjacent sides of such a parallelogram. Finally, as these geometric and trigonometric principles relate to the disclosure and a review thereof may be relevant and appreciated by those having ordinary skill in the art, polygon 330 of FIG. 3C is illustrated therein to demonstrate the polygon law of vector addition. Generally, the polygon law of vector addition states that if a number of vectors can be represented in magnitude and direction by the sides of a polygon taken in the same order, then their resultant is represented in magnitude and direction by the closing side of the polygon taken in the opposite order. These principles, in combination, can be used for various computations in affine space, as are further described in relation to FIG. 4.

Figure 4:
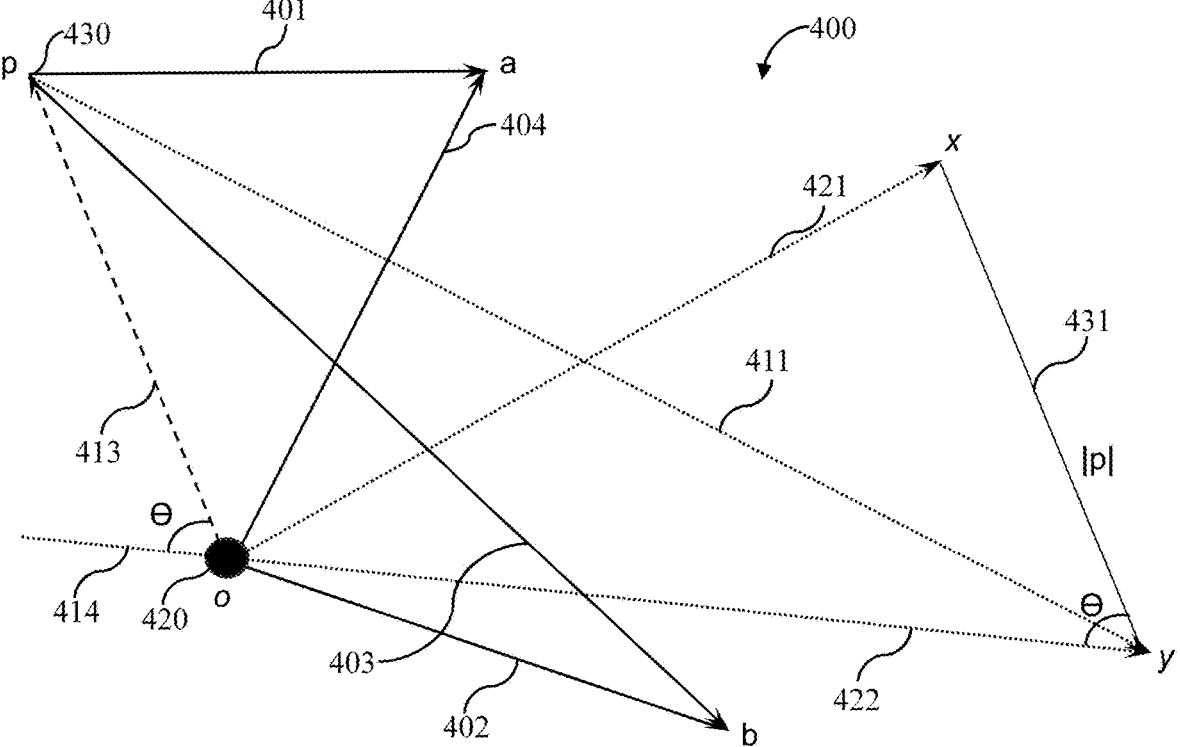
FIG. 4 is a line illustration of exemplary affine space of the disclosure.

FIG. 4 is a line illustration of exemplary affine space of the disclosure and various vector computations according to the principles and laws discussed above. In simple terms as it may relate to affine space, an affine space may be a geometric structure that generalizes some of the properties of Euclidean spaces in such a way that these are independent of the concepts of distance and measure of angles, keeping only the properties related to parallelism and ratio of lengths for parallel line segments. In the example provided, a first entity, e.g., Alice, recognizes an origin from her perspective, which may be Alice's origin 420 or "o". Another entity, e.g., Bob, may recognize a distinct origin from his perspective, which may be Bob's origin 430 or "p". Then, each travelling a distance which can be modelled as vectors, Alice's vector being to point b along vector 402 (or b) and Bob's being to point a on vector 401 (or d from Bob's perspective, but as vectors are represented using Alice's origin, vector 401 may actually be a-p according to Alice), the vectors may be added according to parallelogram law, each respectively by Alice and Bob. However, Alice will recognize the vector addition of vector 401 and vector 402 differently than Bob. Where Bob may observe these vectors to assemble into $\vec{a}+\vec{b}$ of vector 411, Alice may observe the resulting vector 421 (or |p|) as the addition of $\vec{a}+\vec{b}$, and in her determination to obtain vector 422 is p+(a-p)+(b-p) by taking line 431 for |p|. So, while Alice and Bob may both independently compute $\vec{a}+\vec{b}$ and each obtain distinct and/or different vectors, since Alice retains that vector 411 is $\vec{a}+\vec{b}$, which she can translate using her understanding of vector 422 as p+(a-p)+(b-p), or line 431, in addition to applying the polygon of vector addition with the corresponding polygon in this case being the triangle formed from connecting o-x-y. Using such translations from Alice's perspective, Alice's perspective may be continuously adjusted in line with Bob's movements and Bob's interpretations of Alice's movements. It may also be noted that in this example lines 413 and 431 form opposite sides of a parallelogram and are identical lengths and parallel, that vector 403 is b-p according to Alice, and that the angles each ascribed θ therein FIG. 4 are identical and therefore the angles between lines 413 and 414 are identical to the angles between lines 422 and 431. Then, it may be said that in this affine space, while only Alice may understand the linear structure based on these perspective transformations, both Alice and Bob may know and/or understand the affine structure within the affine space. As this may relate to business-oriented methods to obtain purposes of customers as they relate to business offerings, classical affine space as is herein described and relevant to the laws above described in relation to FIGS. 3A-C, affine space may be mapped to business offerings, time, and business/customer interactions and/or touchpoints as may be understood by those having ordinary skill in the art. Each axis may have different origins and vectors may be mapped in such a space, such that various perspectives of individual customers within the space operating at different times, upon different offerings, and different interactions with the business may occur over time. If such vectors are modeled as illustrated in FIG. 4 to where a and b are each events seen from a customer perspective from different touchpoints and/or offerings, the combined effect of two events a+b may also be seen from distinct perspectives, which may be then obtained using such mathematical transformations. As may be relevant to those having ordinary skill in the art, the disclosure relates this affine space to real world incoming datastreams efficiently via real time staging of ongoing engagements into a multipartite, multidimensional space with at least two parts. A first part may consist of factual dimensions and a second may consist of inferred dimensions. Orientation awareness across various customer perspectives while on micro-journeys or larger variations may then be realized using extensions to classical affine space where domains for certain dimensions may be discrete or continuous values, as well as other variations as described below, and may be applicable for an event which may be assigned probabilistic functions with conditionals that may include future events too using predictive algorithms and/or machine learning techniques. Importantly, certain frameworks may be implemented to obtain these perspectives, store and analyze them under certain schema and physical memory layouts, to obtain benefits relevant to the disclosed systems and methods for collecting, organizing, and curating customer engagements across multiple domains to provide contextual nurturing and alignment of customer journeys to business objectives, as further described herein. Additionally, through methods to continuously update the affine space in relation to these various customer perspectives, live coordinates may be established and maintained for factual dimensions and/or otherwise deduced based on contributions from newer events as they occur in real-time in iterative processes as described herein.

Figure 5A:
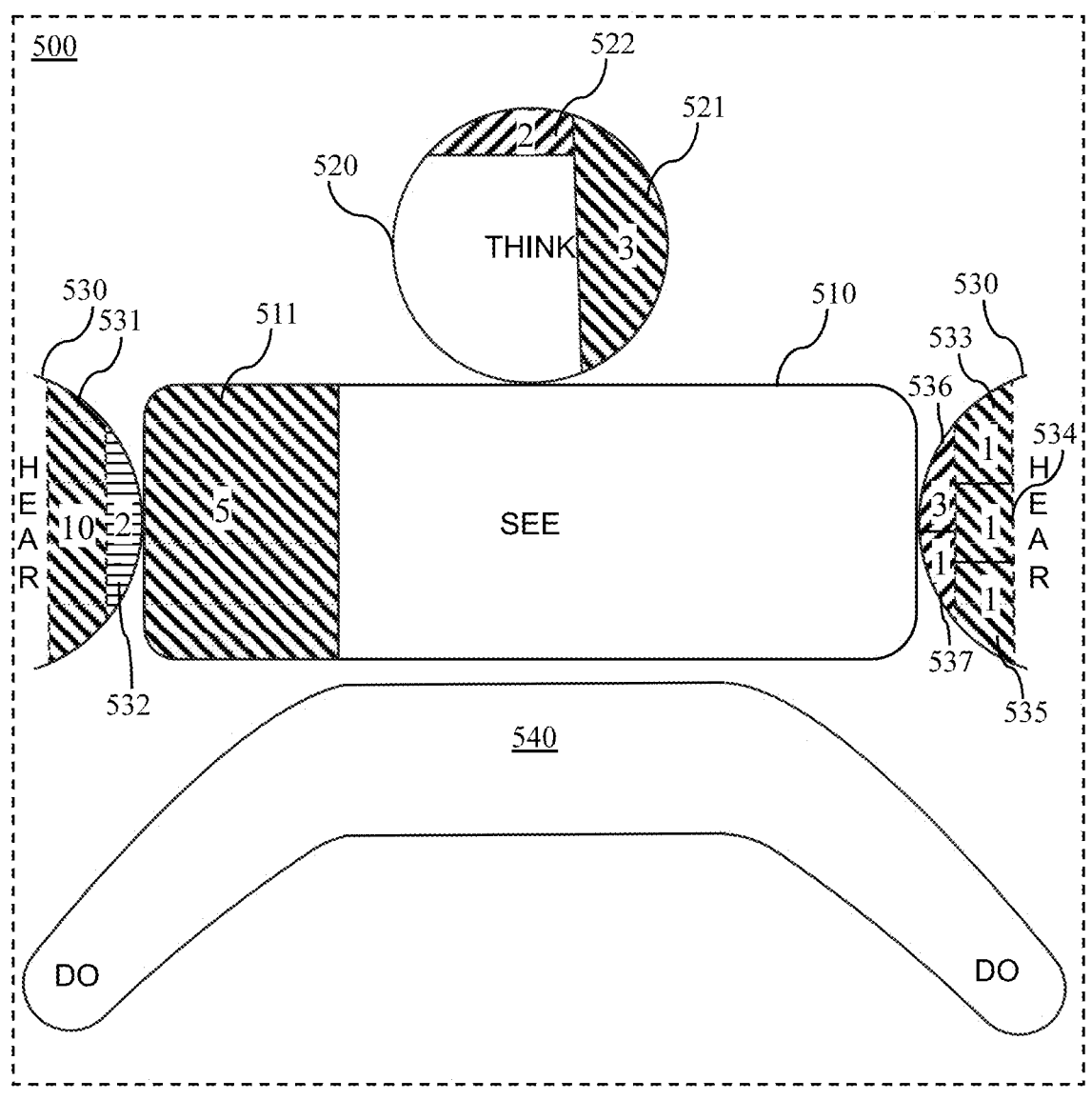
FIG. 5A is a block diagram of a purpose organization schema of the disclosure.

Turning to FIG. 5A, therein illustrated is a block diagram of a customer purpose organization schema 500 (i.e., hierarchy) of the disclosure. Having added quantitative measures for business offerings, time, and business/customer interactions to an affine space, an additional axis, customer purpose, may be added to further develop the benefits and features of customer nurturing of the disclosure. As various interactions from the business to the customer may be determined as touchpoints, certain receptivity to such touchpoints by the customer may be gleaned by certain interactions thereof. Starting with the "Hear" domain 530, or simply "H", communications transmitted to the subscriber, customer, or user may fall under this domain. Some certainty of this domain can be achieved through use of features, such as read receipts or other means customers may passively acknowledge and/or the enterprise can monitor the successful delivery of such touchpoints and/or events. The H domain may be recognized as the most passive of touchpoints and/or interactions, though these interactions may be customized, even to a great degree, to specific customer types or recognized customer needs, but may be the domain which the message has been received, but no evidence exists from the company's perspective that the customer has cognitively registered the message or event. Turning to a more active touchpoint, the "See" domain 510, or simply "S", may occur when a customer recognizes such a message or event in their mind, but no evidence exists in the possession of the enterprise that the customer has connected the message, offer, or event to the specific product or services offering from the enterprise. Then, again increasing in activity, the "Think" domain 520, or simply "T", may apply to situations where events, actions, messages, or offers are from the perspective of the enterprise evidenced to transcend the face value of the touchpoint and has been cognitively associated in the mind of the customer with a purpose, which may have mutual benefits to the customer and the business's interest. Finally, the "Do" domain 540, or simply "D", may correspond to concrete actions by the user or customer toward business ends, such as renewal of service, addition or opening of a new services offering, verbal or similar endorsement of the services/company, or other similar action which may align with a business's interest. Then, certain metrics may be used to assess the level of completeness associated with these touchpoints and their performance at nudging a customer on a micro-journey or customer journey to various business objectives. In the example provided in customer purpose organizational schema 500, various types of touchpoints may be characterized in patterned segments of each domain to obtain "Σ", which may signify a net completeness value of the domain, though the dimensions and values of Σ may not be generally restricted to discrete or continuous values and may be complete or incomplete, strict, weak, loose, non-ordered, rigid, or flexible, and coordinates for an event may be assigned probabilistic functions with conditionals that may include future events. Customer purpose organizational schema 500 as provided may also help to determine "μ", which may be a number of constituents with any domain H/S/T/D, indicated therein FIG. 5 as the number of areas having patterned shading. So, for example, H may have $\Sigma_H$ of 19 and $\mu_H$ of 7 because within the H domain (from left to right and top to bottom) areas having 10, 2, 3, 1, 1, 1, and 1 (i.e., 7 segments adding to 19). Then, in the S domain may have $\Sigma_S$ of 5 and $\mu_S$ of 1. Turning to the T domain may yield $\Sigma_T$ of 5 and $\mu_T$ of 2, with a D domain being empty and a corresponding $\Sigma_D$ of 0 and $\mu_D$ of 0. The net completeness values may further be recognized as a unit-less quantity with the face value itself used as a measure, and may not be normalized. Hence, no specific measure marks a certain level of completeness for an element conclusively, while different purposes may use different thresholds as may be deemed appropriate based on collective observations, heuristics, and domain or domain-level awareness(es). Having determined a schema to establish how various communiques from the business and/or interactions between the business and customer may be categorized to better establish both customer purpose as well as alignment of such interactions to the purpose and overall business objective(s), a purpose alignment "(" for a customer at a given time where there are at least two previous values can be calculated to optimize for communications which more actively or successfully transition from the H domain to the D domain, thereby facilitating more effective means to solicit new business from users while also limiting ineffective communications. As certain encoding properties and physical memory layouts of such a proposed schema may be further understood to recognize the value of such a schema, a review of FIG. 5B, in addition to FIGS. 6-7 and the relevant descriptions thereof may be necessary for such recognition by those having ordinary skill in the art.

Turning now to FIG. 5B, illustrated therein is a block diagram of exemplary accretion strategies of the disclosure among the H/S/T/D domains of FIG. 5A. The strategies illustrated therein FIG. 5B are exemplary only and may be adjusted according to enterprise type and/or any relevant business strategy, or may be pivoted on-the-fly to produce various benefits as may be known or determined by those having ordinary skill in the art. Type A accretion rule 591, Type B escape rule 692, and Type C clustering rule 693 may operate at the level of individual elements therein the H/S/T/D schema illustrated in FIG. 5A, such as those that may be divided to establish $\Sigma$ and $\mu$ as described above. Beginning at Type A accretion rule 591, such a strategy may be employed within the H/S/T/D framework where x denotes a face value of an element, and the rule may be self-explanatory within such a framework in that it may operate according to simple algebra. Accordingly, x x x→$x^2$ may imply an accretion rule that takes three elements of and/or within the H/S/T/D framework and replaces such redundant instances with a single accreted element with a face value of x*x, i.e., $x^2$. An additional rule thereof. Type A accretion rule 591 may capture the accretion of "x" with another element in half the size of x into 1.5 times x, with the accreted value that is 1.5 times the algebraic sum of the values thereof. Turning to Type B escape rule 592, escape of certain elements within the H/S/T/D framework may most closely analogize to the principles of planetary accretion, or the opposite thereof, wherein continuing the analogy objects (or elements in the H/S/T/D framework) having a mass/volume (or weight in the H/S/T/D framework) beneath a certain, potentially specified, threshold fail to accrete into the larger object and instead are dropped, provided their density measured as a face-value by count-of-elements is less than a specific multiple of the larger group density. Hence, in such a Type B escape rule 592 strategy, "d" may be calculated by dividing the sum of $\Sigma_{H/S/T/D}$ by the sum of $\mu_{H/S/T/D}$, and dropping those elements which have J/p ratios less than x*d, as illustrated therein. Finally, Type C clustering rule 693 may be deployed in instances where it may be advantageous to cluster elements into "n" groups via any known or determined algorithm to achieve such clustering, then specifying a different accretion factor according to principles of Type A accretion rule 591 for each cluster thereof.

Figure 6:
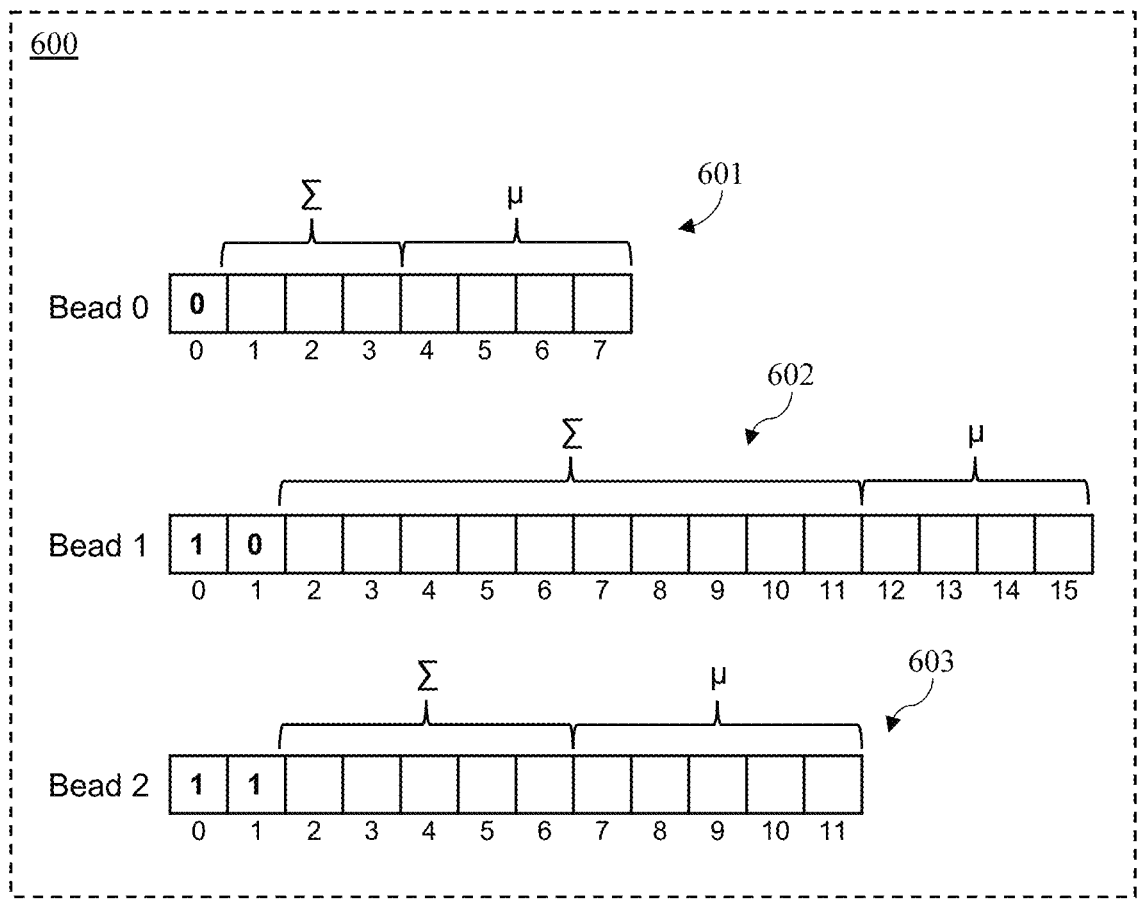
FIG. 6 is a block diagram of an encoding method of purpose organization schema of the disclosure.
Figure 7:
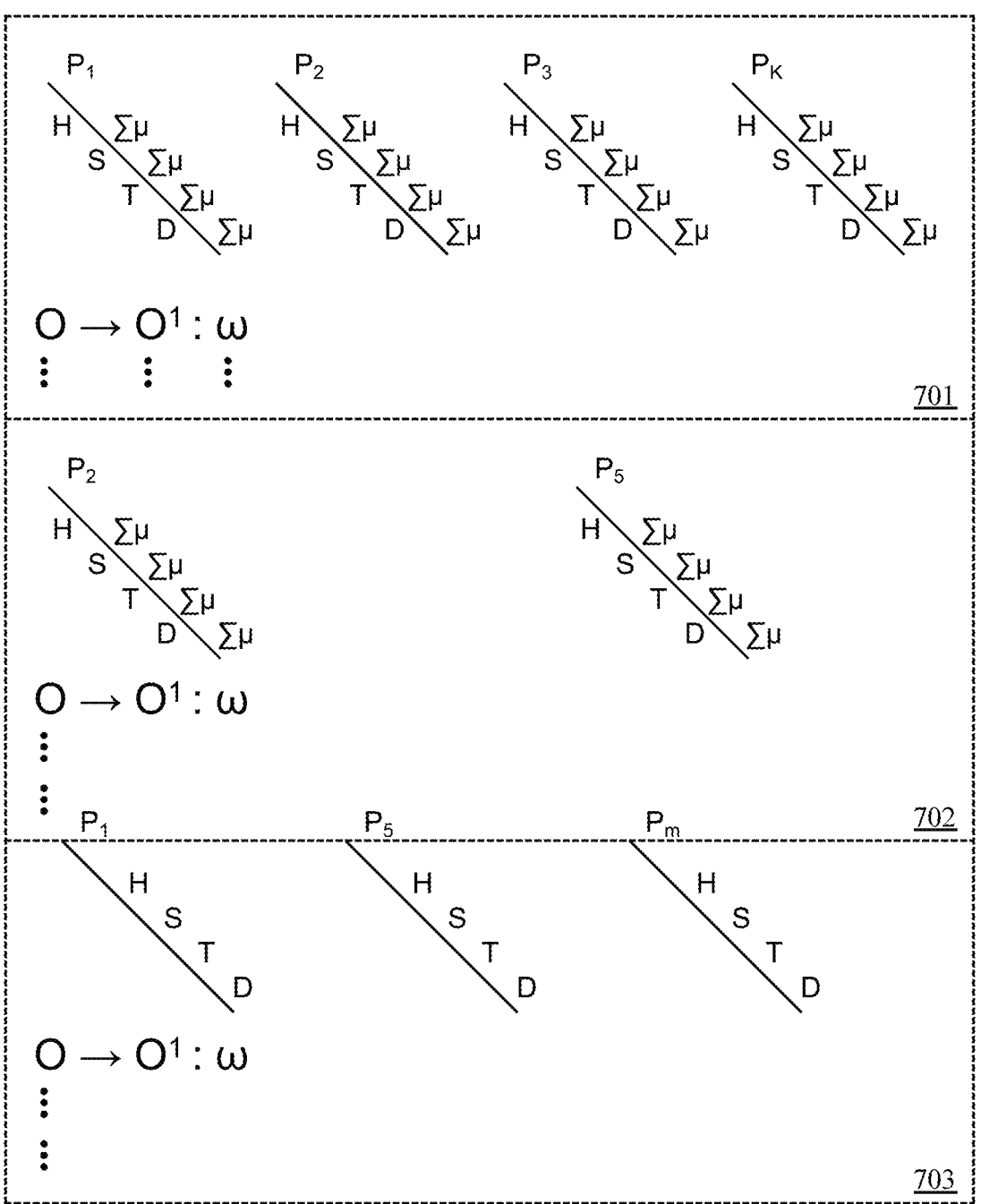
FIG. 7 is a block diagram of a logical data model of the disclosure.

Turning to FIGS. 6-7, illustrated therein are a block diagrams of an exemplary encoding method 600 of purpose organization schema of the disclosure. Exemplary encoding method 600 may provide an optimal physical layout for holding H/S/T/D framework(s) as beads within a physical memory framework while FIG. 7 and subscribers 701-703 as may be visually modelled therein may be understood as a logical model of the affine space while using and retaining multiple perspectives and translators as herein described with a compartment per subscriber where all H/S/T/D values for that subscriber alongside "ω" translations allowable may be stored. Such translators (e.g., "ω . . . ") may be modelled conceptually on lines of Alice's translators (see FIG. 4, e.g., and obtaining 411 using 422 and 431). Perhaps importantly, not all subscribers need to have all the purposes listed, and similarly "ω" translations may not be available for all perspective combinations. In this layout, Bead 0 601, Bead 1 602, and Bead 2 603 may be allocated based on density of information contained in each subscriber purpose domain constituent, such that leading values may be assigned according to the H/S/T/D arrangement and $\Sigma$ precedes $\mu$ in the encoding pattern. Then, the data organization according to the affine space parameters may be assigned translators according to the principles discussed in relation to FIG. 7 below. Hence, in the example provided in FIG. 6, if the most significant bead (MSB)=0, then it corresponds to Bead 0 601 having 8 total bits with 7 bits of non-bead-identification data, of which bits b1, b2, and b3 of Bead 0 would encode $\Sigma$ and bits b4, b5, b6, and b7 would encode $\mu$, enabling room for $2^3$, or 8 $\Sigma$ values in the layout of FIG. 7, and $2^4$, or 16$\mu$ values of Bead 0 601. If MSB=1 and is succeeded by 0, then Bead 1 602 may be inferred, which contains 16 total bits for its width, and 14 bits of informational data as it may relate to $\Sigma$ and $\mu$ information. Then, bits b2-b11 (10 bits) may be assigned to $\Sigma$ values and bits b12-$b$15 (4 bits) to $\mu$. Finally, in this example, if MSB=1 and is succeeded by 1, then Bead 2 603 may be inferred, which contains 12 total bits for its width, and 10 bits of informational data as it may relate to $\Sigma$ and $\mu$ information. Then, bits b2-b6 (5 bits) may be assigned to $\Sigma$ values and bits b7-b11 (5 bits) to $\mu$. Turning to FIG. 7 as it may relate to FIG. 6, therein illustrated is a block diagram of a logical data model of the disclosure, the logical data model being defined in affine space with one compartment per subscriber and may further depict the physical structure of the Beads of FIG. 6 that may store $\Sigma$ and $\mu$ values for H/S/T/D domains. Such organizational structure may offer significant information density benefits, as may be recognized by those having ordinary skill in the art. Then, for each subscriber $S_1$-$S_N$, where "N" may be a very large number given large subscriber datasets, translators "ω" may be assigned according to need and perspective translators may be established as purposes $P_1$-$P_K$ may be developed and relevant to the various subscribers. Such a schema as it may be relevant to memory allocation is further discussed in relation to FIG. 8.

Figure 8:
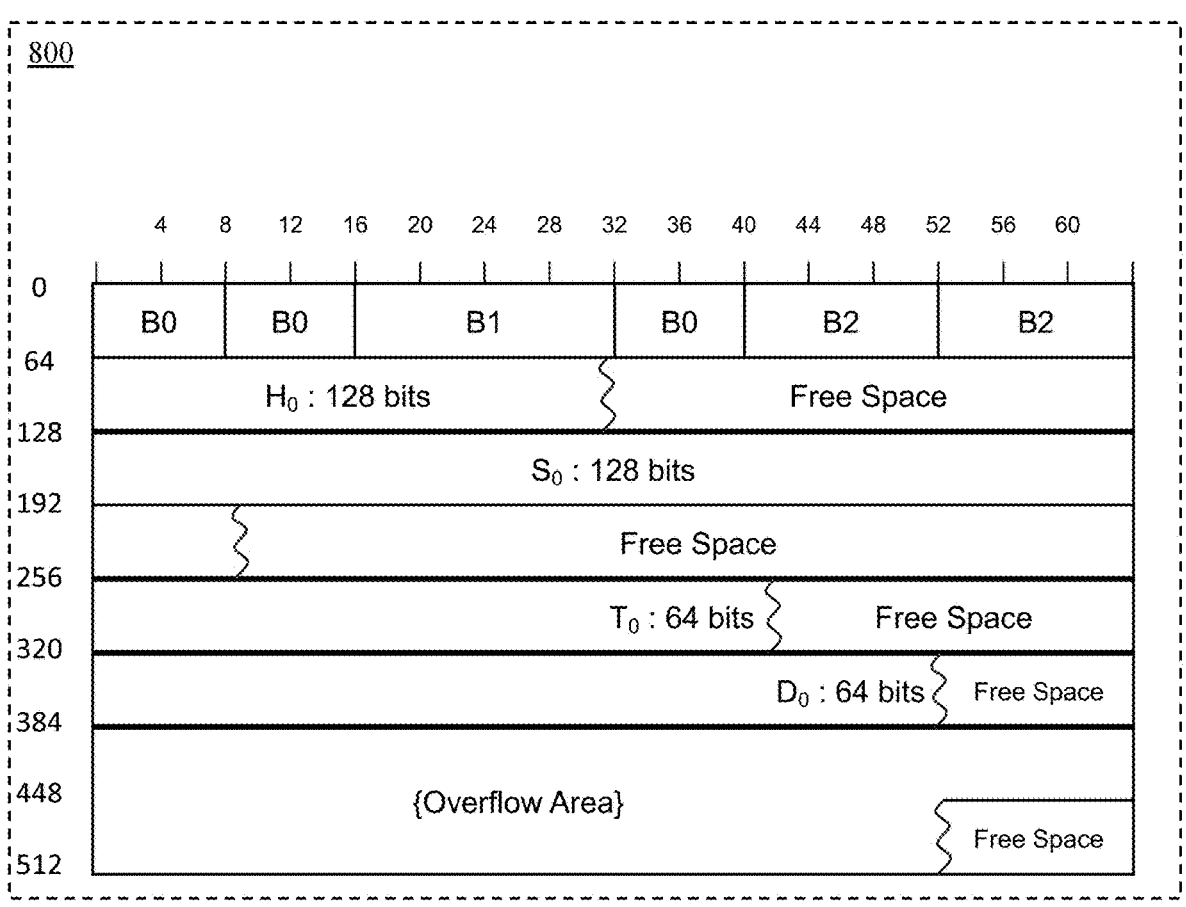
FIG. 8 is a visual illustration of a proposed physical memory layout of the disclosure.

Turning now to FIG. 8, illustrated therein is a visual illustration of a proposed physical memory layout of the disclosure, which may be recognized by those having skill in the art as having 512 bits in total size. As labeled, allocated memory may be pre-designated into bitwise H/S/T/D areas alongside corresponding overflow area. Those having ordinary skill in the art should recognize, when viewing FIG. 8 in light of the previous Drawings, that BOs as illustrated to be contained within physical memory layout 800 are drawn as 8 bits in length, B1 as illustrated to be contained within physical memory layout 900 are drawn as 16 bits in length, and B2s as illustrated to be contained within physical memory layout 800 may be drawn as having 12 bits in length, such that when aligned as B0, B0, B1, B0, B2, and B2 within physical memory layout 800, they may together consume a total of 64 bits. Therefore, those having ordinary skill in the art may in turn recognize that beads within each 512-bit segment (and/or within each 128-bit or 64-bit segment as indicated by the thickened bottom border of such segments therein FIG. 8) of physical memory layout 800 may be contiguous with no holes, the free space of physical memory layout 800 being allocated at ends of each area. Accordingly, when space runs out in any given area, beads may be allocated into the overflow area indicated therein physical memory layout 800, and may be assigned to any of the H/S/T/D domains and counterparts on, for instance, an as-needed basis. Then, accordingly as illustrated therein FIG. 8 for exemplary purposes, a first 128-bit segment may be assigned within physical memory layout 800 to the H domain of the H/S/T/D framework, an identically sized segment then for the S domain, and half-sized segments reserved for T and D domains. Beads in overflow area may also be contiguously allocated, but may not belong to the same constituent H/S/T/D. Additionally, such allocated overflow area may be type-2 multiplexed on control bits $b_0, b_1$, according to the following schema: $0,0=H$, $0,1=S$, $1,0=T$, and $1,1=D$. Additional pages may be allocated as needed and towards the tail of every compartment may lie the available translators area, which may store the subscriber IDs of legal "$\omega$" function for each specific subscriber. "$\omega$" translator deduction may occur in two learning phases (see e.g., FIG. 9A), where exemplary phase 1 computes $\theta$ and on the premise that a valid $\theta$ exists and phase 2 computes $|p|$ according to the polygon law (see e.g., FIG. 3C).

Turning to FIG. 9A, illustrated therein is a method flowchart of an exemplary translator learning model for an artificial intelligence and/or machine learning system of the disclosure. As discussed in relation to FIG. 8 above, additional pages of physical memory layout 800 may be allocated as needed. Then, towards the tail of every compartment may lie an available translators area, which may store the subscriber IDs of a legal "$\omega$" function for each specific subscriber in order to translate certain perspectives among subscribers. As additionally mentioned above in relation to FIG. 8, "$\omega$" translator deduction may occur in two learning phases, where exemplary phase 1 computes $\theta$ and on the premise that a valid $\theta$ exists and phase 2 computes $|p|$ according to the polygon law (see e.g., FIG. 3C). Such learning may be accomplished optimistically, and may converge with concrete values or a result which demonstrates no candid translations can be discovered on the basis of data offered to the learning algorithm. In other words, interactions may be such that it can at least be determined that such associations cannot yet define how to judge and/or interpret an event in one perspective from that of another's perspective. Beginning at step 901, "$\omega$" may be deduced via machine learning where first at this step 901 an offer may be made to a subscriber, such as $[a,b,(a+b)_{Bob}]$, which may be the affine space vector for the offer to the subscriber. Then at step 902, $|a+b|$ may be computed using the parallelogram law described above (see FIG. 3B) and a triangle oxy may be constructed at step 903 using the affine space techniques described in relation to FIG. 4. Then at step 904, for "n" entries, $|p|$ can be computed using the polygon laws described in relation to FIG. 3C on $\Delta xoy$ and at step 905 by computing "$\theta$" using the law of cosines as described in FIG. 3A on $\Delta xoy$, finally emitting $<|p|,\theta>$ at step 906. These steps can then be repeated with all entries at step 910 in a training set to compute the standard deviation for $\theta$ at step 911. If the standard deviation is greater than $T° C$. seeded value based on a certain H/S/T/D domain understanding (e.g., 6°) during the completion of step 911, the training may be stopped at step 912 as translation "$\omega$" may be assumed to be incapable of being accurately obtained with the chosen training set, meaning further data may be needed to provide meaningful and/or useful translators. However, having obtained $\theta$, the system may proceed at step 913 with a second phase of learning using a sample size of n/10 having n/20 values each on either side (i.e., both sides) of the median $\theta$ value when all e are arranged in ascending order may be labeled as set "M". Again, at step 914 a standard deviation on $|p|$ values but from IMI can be computed and a check can be performed if it differs from the median value in M by an amount, e.g., 15%. If so, this training may also be skipped and as it may further be deemed to not possess sufficient synergy in studied and/or observed events to have and/or obtain cross-perspective translators. Otherwise, at step 915, the median $\theta$ from the previous calculation of standard deviation can be used as well as the median value $|p|$ determined above as values for translations "$\omega$". At this point, learning method 900 may be determined to have completed, and translators may have been obtained, leading to newly gained abilities to perform addition within the affine space where events seen from one perspective are offered to the affine space while they are projected across other perspectives too using the translators and vector operations (see FIG. 9B).

Now, turning to FIG. 9B, illustrated therein is method flowchart 990 of an exemplary affine space vector addition technique using the translator learning model of FIG. 9A. As these systems and methods of collecting, organizing, and curating customer engagements across multiple domains to provide contextual nurturing and alignment of customer journeys to business objectives may further relate to concrete user interactions for collecting, organizing, and curating user interactions, affine space may be used additively, such as at step 991 where an offer on interaction <subscriber, perspective, from (a), to (b), {perspective for translator(s)> may first be established. Then at step 992, using affine space models as described herein, a user may be looked up by subscriber ID and at step 992b made an offer where $\mu=1$ and $\Sigma=|a+b|$ computing by the parallelogram (//gram) law of FIG. 3B to the area "A" and purpose "P" determined using a decode on perspective. Area "A" may be one of the domains H/S/T/D and "P" may be an incumbent domain thereof or a new domain thereof. Then at step 993, to continue this addition in affine space, an intersection of perspectives for translation with the translators "$\omega$", which may be available for this subscriber, and may be further labelled "T". For each of the T values, at step 994, considering $|a+b|$ as the offered value on the primary perspective "P", the system may attempt to determine the translated perspective $|p+(a-p)+(b-p)|$ by first at step 994a attempting to deduce 'o' according to the principles as described in relation to FIG. 4 using the angle "$\theta$" and $|p|$ values from "$\omega$", offered value $|a+b|$, and the law of cosines on triangle oxy (see FIG. 3A) and solving the quadratic equation as 2 sides of the triangle and a non-included angle are known. This may yield three possible outcomes: (1) zero solutions to the equation in case which the projection attempt may be skipped, (2) two solutions are obtained and the origin 'o' that best reflects the current state of subscriber on the primary perspective 'P' may be selected, or (3) one value may be obtained which may be deemed as the origin 'o', and then as defined in the affine space parameters described in detail in relation to FIG. 4. Then computing this user's perspective at step 994b $|p+(a-p)+(b-p)|$ as the length of side oy of triangle oxy, and finally, at step 994c, method 900 may conclude by generating and making an offer having $\Sigma$ with $\mu=1$ for the corresponding purpose within the H/S/T/D area within the same subscriber's page.

Figure 10A:
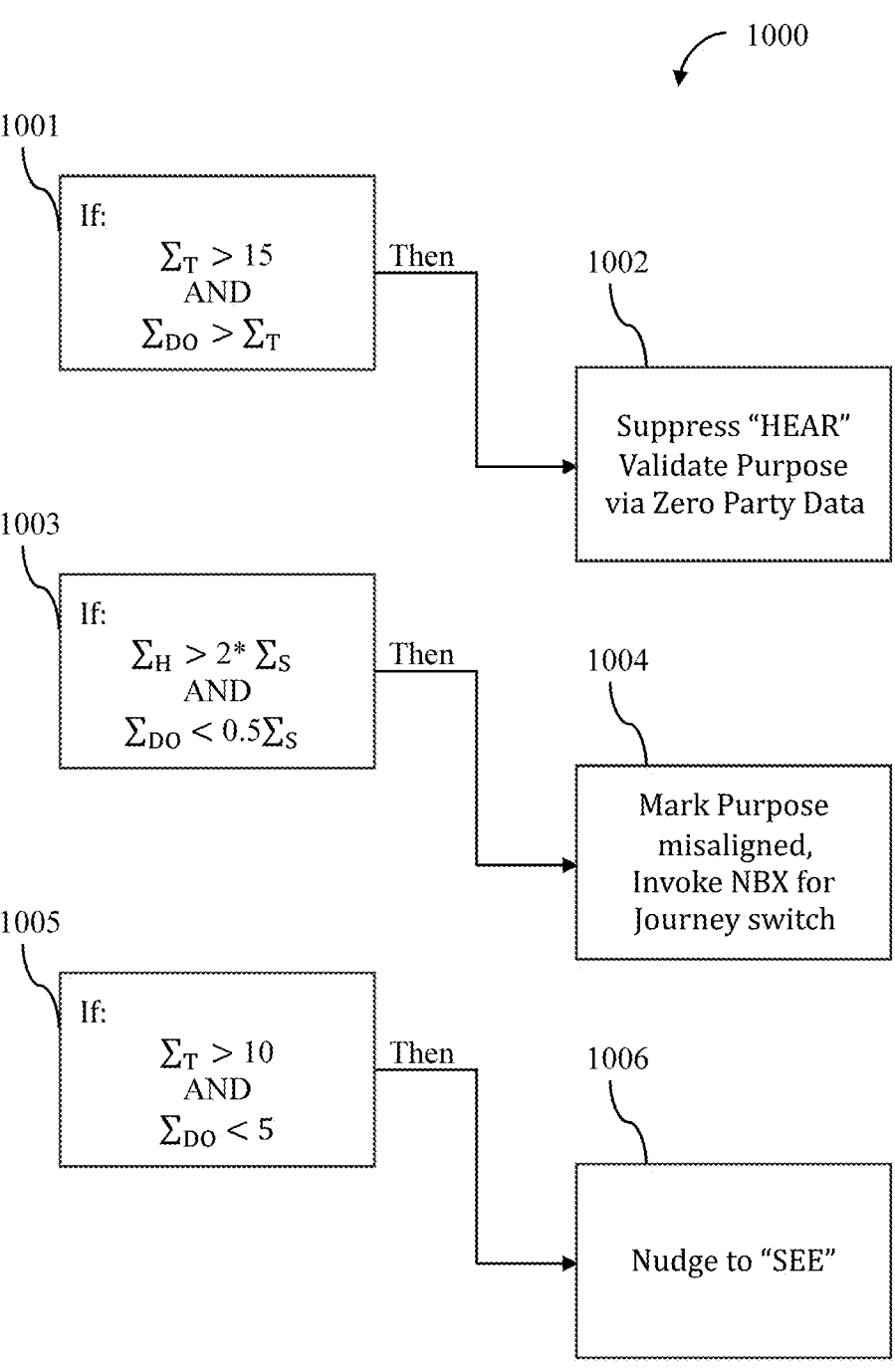
FIG. 10A is a method flowchart of exemplary accretion rules of the disclosure.

Turning to FIG. 10A, therein illustrated is a method flowchart of an exemplary system to provide contextual nudges according to a system of the disclosure. Each IF:THEN block may reflect example scenarios where certain factors within the H/S/T/D domains may be observed and assumptions may be made to improve or otherwise act upon such observations. Beginning at IF block 1001, a situation may arise where a subscriber's or group of subscribers' purpose(s) may be well defined within the H/S/T/D domain. In such scenarios, multiple instances of a user's actions being classified as "THINK" may occur over a period being studied, making $\Sigma$ relatively large (e.g., >15), and the user's actions toward the identified purpose (i.e., "DO") may be even greater. Thus, it may stand to reason that the purpose has been validated and "HEAR" may be suppressed at THEN block 1002 to avoid unnecessary, redundant, or even annoying touchpoints from the enterprise, which may otherwise discourage the user from pursuing the purpose which may be in line with the enterprise's goal. In IF block 1003, situations may arise where users are operating often within the "SEE" domain and "THINK" domain, but never and/or seldomly in the "DO" domain according to the intended Purpose. THEN block 1004 may then be triggered in order to offer the next best experience (NBX) according to business objectives to the user, causing a journey switch toward another business objective. Finally, IF block 1005 may correspond to value determinations for situations where a valid purpose for the user may have been determined in that "THINK" actions occur regularly or semi-regularly, but the user fails to obtain their objective (and meet that objective of the enterprise), in which case nudges toward the SEE domain in THEN block 1006 may be done to more clearly present how to accomplish such a purpose to a user. For instance, the system may cause in these instances a call to be scheduled or a message to be sent with a simpler user experience toward meeting this purpose, which has been identified to be of value and/or desired by the user, but some obstacle (e.g., a GUI flaw on a website) has prevented them from accomplishing the same.

Figure 10B:
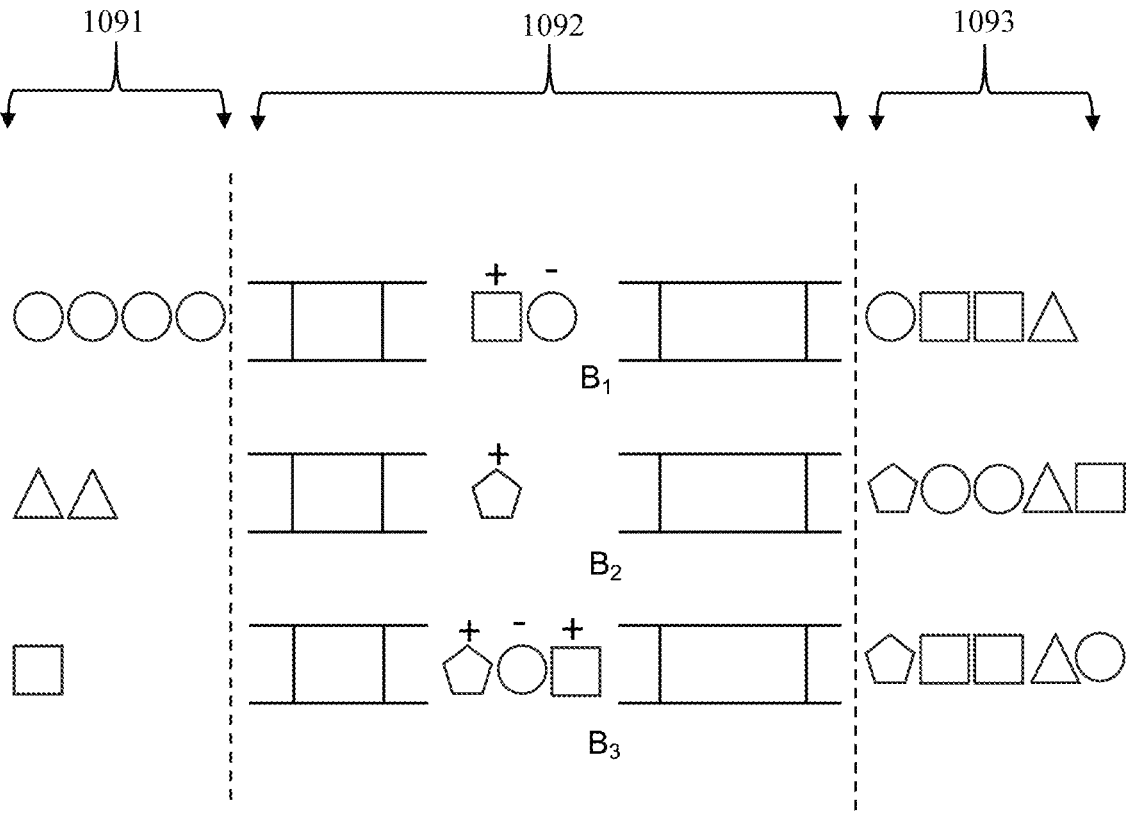
FIG. 10B is a block diagram decisioning techniques of the disclosure.

Turning now to FIG. 10B, illustrated therein is a block diagram of exemplary decisioning techniques for linking via the contextual nudges of FIG. 10A customer purposes toward business objectives via bridges on customer journeys. Broadly, FIG. 10B may represent a decision technique used to nudge customers on an enterprise's system toward those business objectives that align closely with the customer's purposes so as to balance business objectives with customer value and satisfaction. In this example an incumbent subscriber portfolio (or one constructed one solely based on the described system and method's understanding of a subscriber's purposes, but not what the enterprise has set as objectives to offer the subscriber may be represented as shapes 1091. Shapes 1093 may represent the enterprise-desired portfolio and/or those services in best interests of the enterprise. Bridges 1092 may represent a series of patches to transform the subscriber's current service(s) portfolio to one or more that may be ideal or at least more in line with the enterprise's interests across various potential business and customer purpose(s), or perhaps preferably, to retain the existing composition, potentially maximally, but to adjust relative weights of various elements. In the example therein FIG. 10B, the subscriber portfolio may contain four of one services type, two of another, and one of a third. Shapes 1093 may indicate potential end-states for a variety of company-optimal objectives, and the systems and methods of the disclosure may have revealed those services configurations to be potentially purpose-aligned with business objectives. Since bridges 1092 $B_3$ and $B_1$ may require churn of one product/service to align the customer purposes and business objectives, they may be disfavored, and nudges and other techniques to induce a customer journey to shapes 1093 may be selected on $B_2$ instead, as it retains all current portfolio products/services and requires only customer acquisition of a fourth product-type and may therefore be said to be maximally aligned with the customer's purposes, as revealed by the systems and methods of the disclosure.

Figure 11:
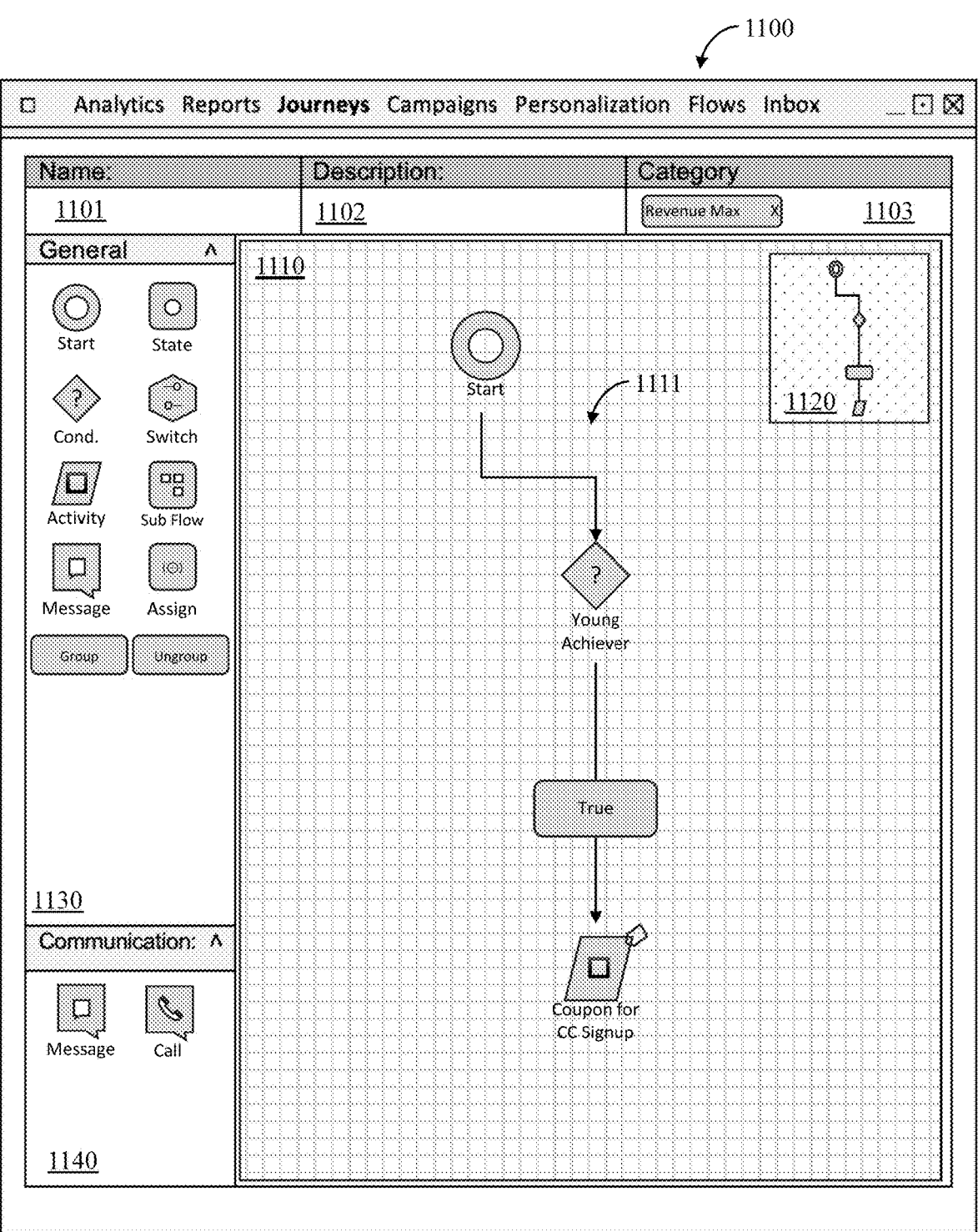
FIG. 11 is a proposed graphical user interface of customer journey creation method of the disclosure; and It is to be noted that the drawings presented are intended solely for the purpose of illustration and that they are, therefore, neither desired nor intended to limit the disclosure to any or all of the exact details of construction shown, except insofar as they may be deemed essential to the claimed disclosure.

Turning to FIG. 11, therein illustrated is a proposed exemplary graphical user interface (GUI) 1100 of customer journey 1111 creation method of the disclosure. Such customer journeys 1111 may come in the form of long, potentially multi-step journeys, microjourneys, or variations thereof. GUI 1100 may enable users thereof to name and/or save customer journeys 1111 using name field 1101, describe them using description field 1102, and categorize them using e.g., tags in category field 1103. In the example provided, Revenue Max may be selected (or deselected), and other tags may be selected by way of example and not limitation profit max, signup max, cost min, investment max, leverage max, the like, and/or combinations thereof. Additionally, as may be relevant to large and/or otherwise complicated customer journeys 1111 within journey map 1110, zoom capabilities may be included and perspective overlay 1120 may be included. In use, a user may select from a plurality of event widgets 1130 and/or touchpoint widgets 1140, which may include those illustrated, a selection thereof, or others as may be understood by those having ordinary skill in the art. In the example customer journey 1111 as provided therein FIG. 11, a user may name a customer marketing campaign using name field 1101, describe it using description field 1102 and categorize it according to the above under "Revenue Max" using category field 1103. Then widgets may be selected from among event widgets 1130, for example, by dragging them from event widgets 1130 onto journey map 1110, which may be blank prior to such user action. In the example provided, the user has selected "start" from event widgets 1130, and mapped to a condition of "Young Achiever", which may select from a plurality of subscribers those having a specific age range and e.g., income or asset level. The user has decided, based upon information that may be obtained using the systems and methods of the disclosure, that a voucher or coupon may be likely to induce the customer to complete the intended customer journey, and placed that as an event and/or communication to the users meeting these conditions and having purpose alignment according to the disclosure. If from among this group, and from among those various purposes as are herein described are met, such a voucher and/or coupon may be shared with the subscriber through various means as may be understood by those having ordinary skill in the art.

With respect to the above description then, it is to be realized that the optimum methods, systems and their relationships, to include variations in systems, machines, size, materials, shape, form, position, function and manner of operation, assembly, order of operation, type of computing devices (mobile, server, desktop, etc.), type of network (LAN, WAN, internet, etc.), size and type of database and/or services provisioned, data-type stored therein databases, and uses thereof, are intended to be encompassed by the present disclosure.

In select embodiments, additional digital engagements, interactions, micro-journeys and other events between brands and customers may be monitored in various forms, including but not limited to social media following/posts, email and SMS marketing (responses), online reviews across a plurality of online review platforms, chat/support interactions, purchases, subscriptions, referrals, "@" mentions, the download/installation/use of mobile apps and other software, the like and/or combinations thereof. Variation may exist among the described engagements and the weights/algorithms/maps assigned thereto. The subject matter of the disclosure is not limited to one particular industry, business type, website, social media platform, or entertainment platform, and the systems and methods disclosed herein are not limited in utility to social media, streaming platforms, review sites, app stores, support platforms and telecommunications device/service. Relevant sectors for use of the system and method of the disclosure may also include agriculture, forestry, fishing, banking, finance, residential/business telecommunications, mining, manufacturing, construction, hospitality education, arts, retail, utilities (e.g., electric, water, gas), healthcare, entertainment, broadcast media, other forms of social media not recited herein, the like and/or combinations thereof.

The foregoing description and drawings comprise illustrative embodiments of the present disclosure. Having thus described exemplary embodiments, it should be noted by those ordinarily skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments of the disclosure will come to mind to one ordinarily skilled in the art to which this disclosure pertains having the benefit of the teachings presented in the foregoing descriptions and the associated drawings. Although specific terms may be employed herein, they are used in a generic and descriptive sense only and not for purposes of limitation. Moreover, the present disclosure has been described in detail, it should be understood that various changes, substitutions and alterations can be made thereto without departing from the spirit and scope of the disclosure as defined by the appended claims. Accordingly, the present disclosure is not limited to the specific embodiments illustrated herein, but is limited only by the following claims.

The invention claimed is:

1. An at least one non-transitory computer readable storage media having a plurality of program instructions and a machine learning module stored thereon that, when executed by an at least one processor having a connection to a network and a memory, directs an at least one computing apparatus to:

continuously receive, via the connection to the network, a real-time digital interaction stream from a plurality of customers and directly organize said stream into said memory at a bitwise level;

analyze, utilizing the machine learning module, a plurality of customer viewpoints depicting a multi-dimensional digital representation of a plurality of customer-business interactions for a plurality of customers, the plurality of customer-business interactions comprising a plurality of factual dimensions and a plurality of inferred dimensions;

classify, utilizing the machine learning module, said plurality of customer-business interactions according to a hierarchy between a communication from a business and a customer action, among the plurality of customers;

determine, based on said hierarchy an at least one customer purpose for each of said plurality of customers, said at least one customer purpose in accordance with an at least one business goal;

utilize a plurality of trigonometric laws to compare within said multi-dimensional digital representation a plurality of customer actions in response to a plurality of customer communications to refine said at least one customer purpose;

encode, via the processor, said hierarchy and said plurality of customer-business interactions into a plurality of bead based memory structures on said memory, each bead comprising a fixed 512-bit allocation with a leading first two bits assigned to identify each element of said hierarchy, said bead-based memory structures instantiated at the bitwise level in system memory connected to said processor and configured to maintain a contiguous allocation of said plurality of bead-based memory structures; and output said at least one proposed customer-business interaction for execution of a customer-facing process.

2. The at least one non-transitory computer readable storage media of claim 1, wherein the machine learning module continuously updates the multi-dimensional digital representation in real-time by deducing a plurality of live co-ordinates for the plurality of factual dimensions based on contributions from a plurality of newer events from the real-time digital interaction stream and factors said plurality of newer events into a plurality of deducing values for said plurality of inferred dimensions.

3. The at least one non-transitory computer readable the program instructions of claim 1, wherein said plurality of trigonometric laws is one or more from a group consisting of a law of cosines, a parallelogram law, and a polygon law.

4. The at least one non-transitory computer readable storage media of claim 3, wherein said customer-facing process is selected from a group of processes, the group consisting of a transmission via the network of a message via email, a transmission of a short message service (SMS) notification via the network, a delivery of a push notification to a mobile application via the network, a causation of a pop-up message within a web interface via a user connection to the network, an initiation of a chatbot interaction via the network, and a generation of an in-application alert on a user device connected to the network.

5. The at least one non-transitory computer readable storage media of claim 1, wherein said plurality of elements are domains comprising a hear element, a see element, a think element, and a do element, wherein said hear element comprises a selection of said customer-business interactions where said customer receives said customer communication, said see element comprises a selection of said customer-business interactions where said real-time digital interaction stream indicates said customer has registered said customer communication, said think element comprises a selection of said customer-business interactions where said real-time digital interaction stream indicates said customer has recognized a value of said customer communication, and said do element comprises a selection of said customer-business interactions where said real-time digital interaction stream indicates said customer has performed said customer action.

6. The at least one non-transitory computer readable storage media of claim 5, wherein said at least one customer purpose is determined via the machine learning module.

7. The at least one non-transitory computer readable storage media of claim 6, wherein said plurality of program instructions and said machine learning module stored thereon said non-transitory computer readable media are further programed to cause the processor to generate said at least one proposed customer-business interaction as a digital notification, customize content of the digital notification according to said hierarchy and said customer purpose, and transmit the digital notification over the network to a plurality of customer devices in real-time.

8. The at least one non-transitory computer readable storage media of claim 7, wherein said plurality of customer communications are an at least one customer communication from a group of customer communications, the group consisting of a touchpoint, a value proposition, a dialogue, an offer, a voucher, a coupon, and a recommendation to switching from a first service to a second service.

9. A method of collecting, organizing, and curating a plurality of customer engagements across multiple customer-business domains in a multi-dimensional digital representation of a plurality of customer-business interactions, the method comprising:

on at least one computing device having a non-transitory computer readable storage media, a processor having a connection to a memory and a network, said non-transitory computer readable storage media with a plurality of program instructions and a machine learning module stored thereon:

continuously receiving, via the connection to the network, a real-time digital interaction stream from a plurality of customers and directly organize said stream into said memory at a bitwise level;

analyzing a plurality of customer viewpoints depicting a plurality of customer-business interactions for a plurality of customers, the customer-business interactions comprising a plurality of factual and a plurality of inferred dimensions, utilizing the machine learning module;

classifying said plurality of customer-business interactions according to a hierarchy between a customer communication from a business and a customer action, among the plurality of customers;

determining, based on said hierarchy an at least one customer purpose for each of said plurality of customers, said at least one customer purpose in accordance with an at least one business goal;

utilizing a plurality of trigonometric laws to compare within said multi-dimensional digital representation a plurality of customer actions in response to a plurality of customer communications to refine said at least one customer purpose; and encoding, via the processor, said hierarchy and said plurality of customer-business interactions into a plurality of bead-based memory structures on said memory, each bead comprising a fixed 512-bit allocation with a leading first two bits assigned to identify each element of said hierarchy, said bead-based memory structures instantiated at the bitwise level in system memory connected to said processor and configured to maintain a contiguous allocation of said plurality of bead-based memory structures;

and outputting said at least one proposed customer-business interaction to a remote system via the connection to the network for execution of a customer-facing process.

10. The method of claim 9, further comprising continuously updating via the machine learning module the multi-dimensional digital representation in real-time.

11. The method of claim 10, further comprising deducing a plurality of live co-ordinates for the plurality of factual dimensions based on contributions from a plurality of newer events from the real-time digital interaction stream.

12. The method of claim 11, further comprising factoring said plurality of newer events into a plurality of deducing values for said plurality of inferred dimensions.

13. The method of claim 9, wherein said plurality of elements are domains comprising a hear element, a see element, a think element, and a do element, wherein said hear element comprises a selection of said customer-business interactions where said customer receives said customer communication, said see element comprises a selection of said customer-business interactions where said real-time digital interaction stream indicates said customer has registered said customer communication, said think element comprises a selection of said customer-business interactions where said real-time digital interaction stream indicates said customer has recognized a value of said customer communication, and said do element comprises a selection of said customer-business interactions where said real-time digital interaction stream indicates said customer has performed said customer action.

14. The method of claim 13, further comprising determining said at least one customer purpose via the machine learning module.

15. The method of claim 14, further comprising determining a level of completeness for said plurality of elements via said machine learning module.

16. A system for collecting, organizing, and curating a plurality of customer engagements across multiple customer-business domains in a multi-dimensional digital representation of a plurality of customer-business interactions, the system comprising:

an at least one computing device having an at least one non-transitory computer readable storage media having a plurality of program instructions and a machine learning module stored thereon, an at least one processor, a network connection, and an at least one memory, the computing device in continuous receipt of a real-time digital interaction stream from a plurality of customers and directly organize said stream into said memory at a bitwise level, the processor in communication with the non-transitory computer readable storage media directs the at least one computing device to:

analyze, utilizing the machine learning module, a plurality of customer viewpoints depicting a multi-dimensional digital representation of a plurality of customer-business interactions for a plurality of customers, the customer-business interactions comprising a plurality of factual dimensions and a plurality of inferred dimensions;

classify, utilizing the machine learning module, said plurality of customer-business interactions according to a hierarchy between a communication from a business and a customer action, among the plurality of customers;

determine, based on said hierarchy an at least one customer purpose for each of said plurality of customers, said at least one customer purpose in accordance with an at least one business goal;

utilize a plurality of trigonometric laws to compare within said multi-dimensional digital representation a plurality of customer actions in response to a plurality of customer communications to refine said at least one customer purpose;

encode, via the processor, said hierarchy and said plurality of customer-business interactions into a plurality of bead-based memory structures on said memory, each bead comprising a fixed 512-bit allocation with a leading first two bits assigned to identify each element of said hierarchy, said bead-based memory structures instantiated at the bitwise level in system memory connected to said processor and configured to maintain a contiguous allocation of said plurality of bead-based memory structures;

and output said at least one proposed customer-business interaction to a remote system via the network connection for execution of a customer-facing process.

17. The system of claim 16, wherein said at least one customer purpose is determined via the machine learning module.

18. The system of claim 16, wherein said multi-dimensional digital representation is modelled as an affine space.

19. The system of claim 16, wherein said plurality of elements are domains comprising a hear element, a see element, a think element, and a do element, wherein said hear element comprises a selection of said customer-business interactions where said customer receives said customer communication, said see element comprises a selection of said customer-business interactions where said real-time digital interaction stream indicates said customer has registered said customer communication, said think element comprises a selection of said customer-business interactions where said real-time digital interaction stream indicates said customer has recognized a value of said customer communication, and said do element comprises a selection of said customer-business interactions where said real-time digital interaction stream indicates said customer has performed said customer action.

20. The system of claim 16, wherein said at least one customer purpose is determined via the machine learning module and wherein a level of completeness for said plurality of elements is determined via said machine learning module.

* * * * *